United States Patent [19]

Imazeki et al.

[11] Patent Number: 5,357,357
[45] Date of Patent: Oct. 18, 1994

[54] LIQUID CRYSTAL DISPLAY DEVICES WITH ORGANIC THIN FILM FORMED BY COMPRESSING MOLECULES ON LIQUID SURFACE AND TRANSFERRING TO SUBSTRATE BY HORIZONTAL LIFTING

[75] Inventors: Shuji Imazeki; Yasushi Tomioka; Naoki Tanaka, all of Saitama; Yoshio Taniguchi, Hino; Hideaki Kawakami, Chiba; Katsumi Kondo, Katsuta; Masami Yamasaki, Saitama, all of Japan

[73] Assignee: Hitachi, Ltd., Tokyo, Japan

[21] Appl. No.: 584,971

[22] Filed: Sep. 19, 1990

[30] Foreign Application Priority Data

Sep. 20, 1989 [JP] Japan ................................. 1-241975
Sep. 20, 1989 [JP] Japan ................................. 1-241990
Sep. 25, 1989 [JP] Japan ................................. 1-246289

[51] Int. Cl.[5] ............... G02F 1/1337; G02F 1/1335; C09K 19/00
[52] U.S. Cl. ........................ 359/76; 359/63; 359/75; 428/1
[58] Field of Search ............... 359/75, 63, 76, 87; 428/1

[56] References Cited

U.S. PATENT DOCUMENTS

| | | | |
|---|---|---|---|
| 3,941,901 | 3/1976 | Harsch | 427/108 |
| 3,966,304 | 6/1976 | Kakeda | 359/78 |
| 4,241,984 | 12/1980 | Leibowitz | 359/76 |
| 4,863,763 | 9/1989 | Takeda et al. | 427/355 |
| 4,911,958 | 3/1990 | Mochizuki et al. | 359/75 |
| 4,921,728 | 5/1990 | Takiguchi et al. | 427/58 |
| 4,938,569 | 7/1990 | Tsunoda et al. | 359/75 |
| 4,974,940 | 12/1990 | Asano et al. | 359/75 |
| 5,046,822 | 9/1991 | Matsuda et al. | 359/78 |
| 5,067,797 | 11/1991 | Yokokura et al. | 359/76 |
| 5,099,344 | 3/1992 | Tsuboyama et al. | 359/75 |
| 5,118,538 | 6/1992 | Escher et al. | 359/75 |

FOREIGN PATENT DOCUMENTS

| | | |
|---|---|---|
| 0022618 | 1/1981 | European Pat. Off. . |
| 0203780 | 12/1986 | European Pat. Off. . |
| 0277567 | 8/1988 | European Pat. Off. . |
| 0353760 | 2/1990 | European Pat. Off. . |
| 51-65960 | 6/1976 | Japan . |
| 53-19042 | 2/1978 | Japan . |
| 53-76049 | 7/1978 | Japan . |
| 58-31318 | 2/1983 | Japan . |

(List continued on next page.)

OTHER PUBLICATIONS

Thin Solid Films, vol. 178, No. 1, pp. 253–259, Netherlands; Nerger et al., "Polyesters and Polyurethanes as Propolymerized Materials for Langmuir–Blodgett Films: Preparation and Characterization of Multilayers".

(List continued on next page.)

*Primary Examiner*—Anita P. Gross
*Attorney, Agent, or Firm*—Pennie & Edmonds

[57] ABSTRACT

An organic thin film obtained by spreading an organic substance comprising a polymer on a liquid surface, and compressing the spread substance unidirectionally or in two directions facing each other, in which organic thin film the principal chain of said polymer in the surface of the film has been oriented perpendicularly to the direction of the compression, and a method for producing the same. A liquid crystal display device comprising substrates, a polarizer, electrodes at least one of which is transparent, if necessary semiconductor substrates at least one of which is transparent, an orientation-controlling film and a liquid crystal layer, among which at least one of the polarizer, electrode, semiconductor substrate, orientation-controlling film and liquid crystal layer comprises an organic thin film. The orientation-controlling film may be an organic thin film in which the film-forming molecules have been uniformly oriented in a particular direction in the surface of the film. The present invention provides an oriented organic thin film, a liquid crystal display device with the oriented organic thin film and a thin and flexible liquid crystal display device.

23 Claims, 12 Drawing Sheets

FOREIGN PATENT DOCUMENTS

| | | | |
|---|---|---|---|
| 62-211617 | 9/1987 | Japan . | |
| 62-212625 | 9/1987 | Japan | 359/76 |
| 62-215928 | 9/1987 | Japan . | |
| 62-231221 | 10/1987 | Japan | 359/76 |
| 62-291622 | 12/1987 | Japan | 359/76 |
| 63-141639 | 6/1988 | Japan . | |
| 63-201626 | 8/1988 | Japan . | |
| 64-18470 | 1/1989 | Japan . | |
| 58-091427 | 5/1983 | Japan . | |
| 58-120220 | 7/1983 | Japan . | |
| 59-58419 | 4/1984 | Japan . | |
| 59-210416 | 11/1984 | Japan . | |
| 60-216337 | 10/1985 | Japan . | |
| 60-222824 | 11/1985 | Japan . | |
| 61-59428 | 3/1986 | Japan . | |
| 61-278827 | 12/1986 | Japan . | |
| 62-209415 | 9/1987 | Japan . | |

OTHER PUBLICATIONS

Thin Solid Films, vol. 179, No. 1, pp. 191–197, Netherlands; Nishikata et al, "Preparation and Properties of Poly(p-phenylenevinylene) Langmuir–Blodgett Film".

Thin Solid Films, vol. 178, No. 1, pp. 403–411, Netherlands; Lupo et al, "Structure and Properties of Langmuir–Blodgett Films made from Polyamides".

Thin Solid Films, vol. 179, No. 1, pp. 199–206, Netherlands; Watanabe et al, "Fabrication of Novel Electrically Conductive Langmuir–Blodgett Thin Films of the Poly(3-alkyl-thiophenes)".

I. Ledoux, et al., "Second Harmonic Generation in Alternate Non-Linear Langmuir–Blodgett Films", Thin Solid Films, Jun. 1988, vol. 160, No. 1, pp. 217–230.

J. J. Burack, et al., "Enhanced Moisture Protection of Electronic Devices by Ultra–Thin Polyimide Films", IEEE Transactions on Components, Hybrids and Manufacturing Technology, Mar. 1990, vol. 13, No. 1, pp. 214–218.

K. Ogawa, et al., "Highly ordered monolayer assemblies of phthalocyanine derivatives", Journal of Chemical Society, Chemical Communications, 15 Apr. 1989, No. 8, pp. 477–479.

H. Ikeno, et al., "LCDs fabricated using Langmuir–Blodgett polyimide orientation films", SID International Symposium Digest, 26 May 1988, vol. XIX, pp. 45–48.

Applied Physics Letters, vol. 51, No. 16, Oct. 19, 1987, pp. 1283–1284, New York, US; J. Nehring et al., "High-pretilt polyphenylene layers for liquid-crystal displays".

Journal of Molecular Electronics, vol. 1, 1985, pp. 3–17, Chichester, GB; M. Sugi, "Langmuir–Blodgett films-a course towards molecular electronics: a review".

Patent Abstracts of Japan, filed on Oct. 6, 1987, vol. 11, No. 305 (P-623) (2752).

Patent Abstracts of Japan, filed on Nov. 11, 1988, vol. 12, No. 427 (P-784) (3274).

Patent Abstracts of Japan, vol. 10, No. 38 (P-428) (2095), Feb. 14, 1986.

M. Era et al., Polymer Preprints, Japan, 37(10) (1988) p. 3279, "Poly(p-phenylenevinylene) thin film of oriented structure by Langmuir–Blodgett Technique".

J. E. Biegajski et al., Langmuir, 4, pp. 689–693, (1988). "Monolayer and Langmuir–Blodgett Multilayer Surface and Spectral Studies of Poly-3-BCMU".

T. Kajiyama et al., Chemistry Letters, pp. 813–816 (1989), "Aggregation States and Electro-Optical Properties Based on Light Scattering of Polymer/(Liquid Crystal) Composite Films".

FIG. 5

$$\text{\textit{+}}\underset{\underset{R2}{|}}{\overset{\overset{R1}{|}}{C}}-C\equiv C-\underset{}{C}\text{\textit{+}}_n$$

FIG. 5(a) R1=R2 ; $-(CH_2)_3-O-\underset{\underset{O}{\|}}{C}-\underset{\overset{H}{|}}{N}-CH_2-\underset{\underset{O}{\|}}{C}-O-C_4H_9$ FIG. 5(b) R1=R2 ; $-(CH_2)_4-O-\underset{\underset{O}{\|}}{C}-\underset{\overset{H}{|}}{N}-CH_2-\underset{\underset{O}{\|}}{C}-O-C_4H_9$ FIG. 5(c) R1=R2 ; $-(CH_2)_n-O-\underset{\underset{O}{\|}}{C}-\underset{\overset{H}{|}}{N}-CH_2-\underset{\underset{O}{\|}}{C}-O-C_4H_9$
(n ; 2, 5~12)

FIG. 5(d) R1=R2 ; $-CH_2-O-\underset{\underset{O}{\|}}{C}-\underset{\overset{H}{|}}{N}-C_2H_5$ FIG. 5(e) R1=R2 ; $-CH_2-O-\underset{\underset{O}{\|}}{C}-\underset{\overset{H}{|}}{N}-C_6H_5$ FIG. 5(f) R1=R2 ; $-(CH_2)_4-O-\underset{\underset{O}{\|}}{C}-\underset{\overset{H}{|}}{N}-C_2H_5$ FIG. 5(g) R1=R2 ; $-(CH_2)_4-O-\underset{\underset{O}{\|}}{C}-\underset{\overset{H}{|}}{N}-C_6H_5$ FIG. 5(h) R1=R2 ; $-(CH_2)_4-O-\underset{\underset{O}{\|}}{C}-\underset{\overset{H}{|}}{N}-CH-(CH_3)_2$ FIG. 5(i) R1=R2 ; $-CH_2-O-SO_2-C_6H_4CH_3$ FIG. 5(j) R1=R2 ; $-CH_2-O-SO_2-C_6H_5F$ FIG. 5(k) R1=R2 ; $-(CH_2)_4 O SO_2 C_6H_4 CH_3$ FIG. 5(l) R1=R2 ; —CH2N·C12H8 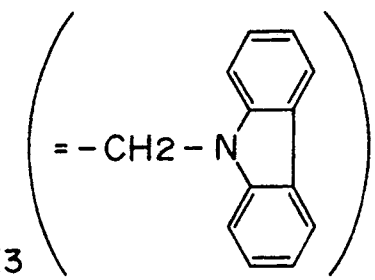 (= —CH2—N‹carbazole›)
FIG. 5(m) R1=R2 ; —C6H4NHCOCH3
FIG. 5(n) R1=R2 ; —(CH2)2OH
FIG. 5(o) R1=R2 ; —CH2CO2(CH2)8CH3
FIG. 5(p) R1 ; —CH3   R2 ; —CH2OH
FIG. 5(q) R1 ; —(CH2)$_m$CH3
R2 ; —(CH2)$_n$COOH
(m ; 3~16, n ; 2~10)
FIG. 5(r) R1 & R2(CYCL.) ;
—C6H4OCO(CH2)3COOC6H4—

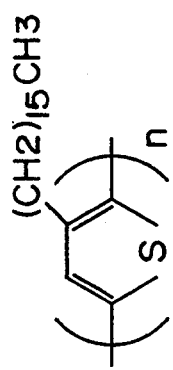
F I G. 8A
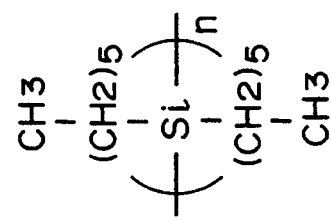
F I G. 8D
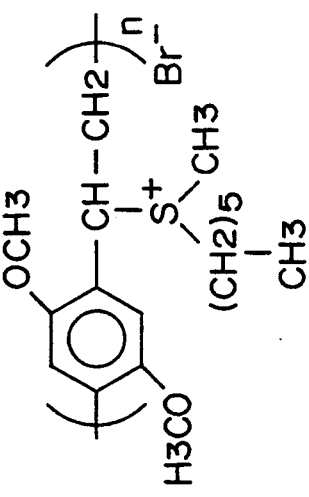
F I G. 8B
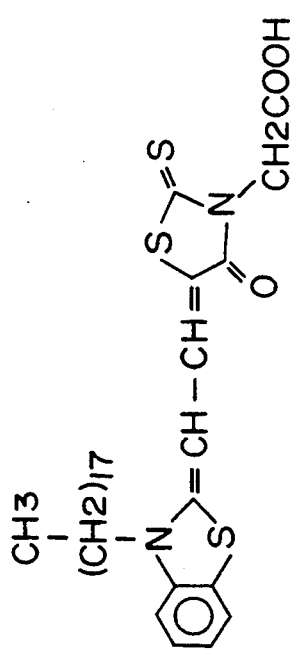
F I G. 8E
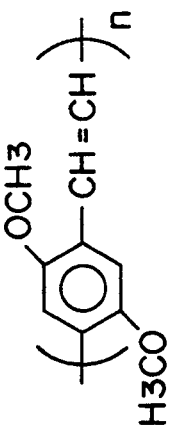
F I G. 8C

FIG. 12A
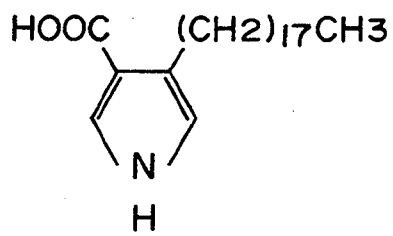
FIG. 12B
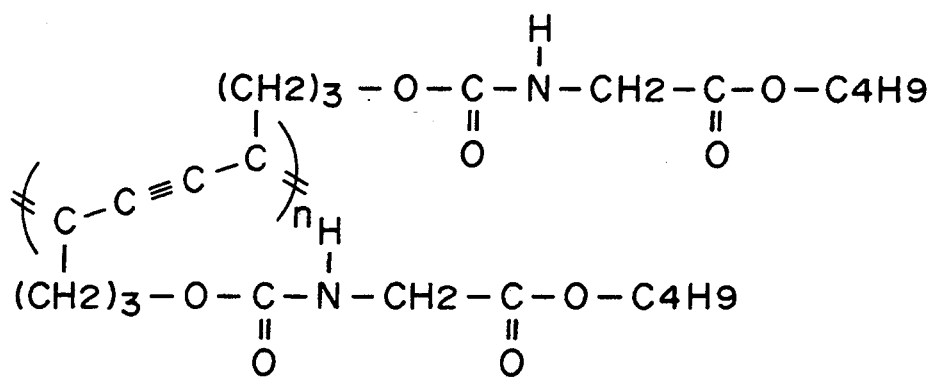
FIG. 12C
% BY WEIGHT
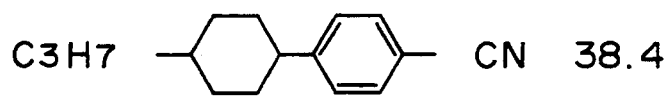 38.4
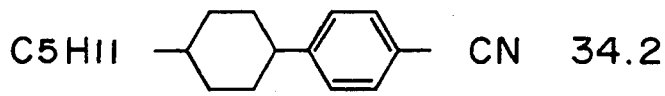 34.2
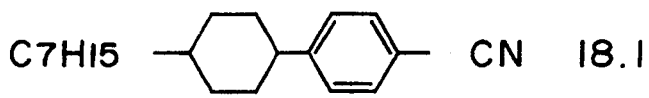 18.1
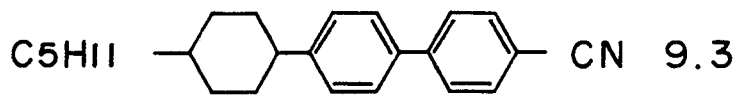 9.3

LIQUID CRYSTAL DISPLAY DEVICES WITH ORGANIC THIN FILM FORMED BY COMPRESSING MOLECULES ON LIQUID SURFACE AND TRANSFERRING TO SUBSTRATE BY HORIZONTAL LIFTING

BACKGROUND OF THE INVENTION

1. FIELD OF THE INVENTION

The present invention relates to an organic thin film having an electric or optical function and a method for producing the same, and more particularly to an organic thin film composed of organic molecules which are in good orientation and a method for producing the same.

Further, the present invention relates to a liquid crystal display device, and more particularly to a thin or flexible liquid crystal display device composed nearly alone of organic substances.

Still further, the present invention relates to an orientation-controlling film for use in liquid crystal display devices, and particularly to a liquid crystal display device in which the above organic thin film is used as a liquid crystal orientation-controlling film suitable for use in nematic and smectic liquid crystal display devices.

2. DESCRIPTION OF RELATED ART

Recently, studies on functional organic thin films are being actively made with a mind turned to future electronic devices, the so-called "molecular electronics". These studies are intended to apply electronic, optical and chemical functions inherent to organic molecules to electronics and optoelectronics materials, energy conversion materials and the like. In order to develop these various functions effectively in the form of a molecular assembly, particularly a thin film, it is said to be indispensable to highly control the structure of the molecular assembly, in other words, to control the orientation and arrangement of the constituent molecules. The conventionally known thin film-making techniques include dry-type thin film-making methods such as a vacuum evaporation method, molecular beam epitaxy method, cluster ion beam method, ion beam evaporation method, ion plating method, photo CVD method, plasma CVD method, etc., and wet-type thin film-making methods such as a Langmuir.Blodgett (LB) method, dipping method, spraying method, spin-coating method, casting method, electro-deposition method, etc. Particularly, the LB method is a technique which is recently re-appreciated because of its ability to form a multilayer film having a periodic order of molecular order in the deposition direction of monomolecular films. At present, organic thin films composed of organic molecules in controlled orientation and arrangement are being produced by these methods, and the thin films obtained are being characterized. Since, however, most of the organic thin films produced by the above various methods are a polycrystalline thin film which is low in in-plane orientational order and difficult to develop good functions, various devices are being made in order to improve these defects. For example, the following methods have been thought out: In the LB method, a method of moving a substrate up and down to induce the flow orientation of organic molecules or molecular aggregates in the monomolecular film, thereby improving the in-plane orientational order of the molecules; and in the vacuum evaporation method, a method of promoting epitaxial growth using the cleavage plane of an alkali halide as the substrate to which a vacuum evaporation is applied, and a method of producing a thin film of oriented polydiacetylene by rubbing the substrate.

The foregoing conventional techniques are described in Japanese Patent Application Kokai No. 64-18 470, J. Le Moigne et al., J. Chem. Phys., 88, 6647 (1988) and M. Era et al., Polymer Preprints. Jpn., 37, 3279 (1988).

Even the organic thin films which are produced by the foregoing various methods and said to be improved in the in-plane orientational order are not still said to be satisfactory in the orientational order and its completeness, and problems are still left. For example, when the flow orientation effect is used in the LB method, the degree of in-plane orientational order is non-uniform. Also, in the method wherein the cleavage plane of an alkali halide is used as the substrate to which the vacuum evaporation is applied, there are defects such as generation of grain boundary and poor stacking which are thought to be due to non-matching of lattice constants. Further, the organic thin film-making methods now in use are difficult in obtaining a thin film having an area as large as about several tens $cm^2$ and a uniform in-plane molecular orientation.

The present inventors have studied to solve the foregoing problems and defects, and as a result, have found that a uniform and highly oriented thin film is obtained by the method which comprises forming a monomolecular film or such a film at a gas/liquid interface containing a polymer having a particular functional group as a main film-forming substance, copressing the formed monomolecular film or such a film on the liquid surface unidirectionally or in anti-parallel direction facing each other to form an organic thin film at the gas/liquid interface in which the film-forming molecules have been oriented in a particular direction in the surface of the film and then transferring the thin film to a solid substrate by a horizontal lifting method or horizontal immersing method as well as by the method of forming a thin film which comprises applying various deposition techniques to the thin film produced by the above method.

As is shown in FIG. 1, the conventional liquid crystal display device is composed of polarizers 6 supported by glass substrates 5, spacers 10 for maintaining the thickness of the liquid crystal layer 9 constant, orientation-controlling films 8 for orienting the liquid crystal, transparent electrodes or semiconductor devices 7 for driving the liquid crystal and glass substrates 5 for holding the whole liquid crystal cell. Such the conventional liquid crystal cell has problems that they are thick and heavy. In order to overcome these defects, however, there is reported a technique of reducing the weight of the cell or making it flexible by replacing the upper and lower glass substrates of the cell by plastic films or plastic plates (Japanese Patent Application Kokai No. 53-19042).

In the above conventional technique, however, a sufficient consideration is not given to making the liquid crystal cell flexible, so that there are problems to be solved for realizing flexible liquid crystal display devices. Concretely speaking, consideration is not fully given to the glass substrates supporting a polarizer and an analyzer held in the liquid crystal cell, and also there is no sufficient device to keep the thickness of the liquid crystal layer constant.

The present inventors have found that by using the method of transferring a monomolecular film or such a film spread on a gas/liquid interface successively to a solid substrate to form an organic thin film, a flexible and/or thin liquid crystal display device composed nearly alone of organic substances can be produced in which a transparent electrode(s) or semiconductor device(s), a polarizer, an analyzer, an orientation-controlling film and a liquid crystal layer of uniform thickness are disposed in layer on a transparent polymer film.

For obtaining a good display quality of liquid crystal display devices, it is important to cause the liquid crystal molecules to take a uniform orientation by forming an orientation-controlling film in the inside of the devices. Therefore, a large number of studies on the orientation-controlling film have been made. As typical examples of such the film, there is known an organic orientation-controlling film made to acquire an orientation-controlling ability by applying the rubbing treatment to the film of an organic polymer (e.g. polyimide) (Japanese Patent Application Kokai No. 50-83051 and No. 51-65960), and this film has been put to practical use. Recently, further, it is proposed to use as the orientation-controlling film a polyimide film deposited in layer on a substrate by the LB method (Japanese Patent Application Kokai No. 62-209415, No. 62-211617 and No. 62-215928).

Recently, however, it has become clear that the afore-mentioned orientation-controlling film has some problems when viewed from the standpoint of a liquid crystal device-manufacturing process.

For example, the common orientation-controlling polyimide film, which is produced by the method of applying a polyimide precursor solution to a substrate by means such as a spinner method, dipping method, printing method, etc., has a problem that a sufficiently uniform film thickness is not obtained when the formation of a film of 1500 Å or less in thickness is aimed at by this method. Non-uniformity in thickness of the orientation-controlling film causes non-uniformity in the threshold voltage of a liquid crystal display device, as a result of which unevenness of display sometimes occurs.

When organic polymer films formed by the above means are used as the orientation-controlling film, a treatment of rubbing the film surface with cloth, called "rubbing", is applied. This treatment sometimes generates static electricity on the film or stains the film surface. The static electricity generated on the orientation-controlling film sometimes breaks the transparent electrode on the substrate, in which case non-lighted parts appear in the liquid crystal display device.

In an active matrix liquid crystal device, the static electricity generated by the rubbing treatment sometimes breaks its thin film transistor (TFT) or changes the switching characteristics of the transistor. When the surface of the orientation-controlling film is stained due to the rubbing treatment, the frequency dependency of the threshold voltage of the device becomes non-uniform.

With an increase in the size of the substrate, it becomes difficult to control a load of rubbing on the whole substrate, so that the large-sized substrate is sometimes scratched by the rubbing.

When a polyimide precursor is applied or deposited on the substrate by either of the spinner method, dipping method, printing method or LB method, the precursor must be imidated by heating or chemicals treatment. Such the treatment is not desirable in principle for the substrate loaded with TFT.

SUMMARY OF THE INVENTION

The present inventors have found the following:

(1) When molecules of an organic substance comprising a polymer having a particular substituent are spread as film-forming molecules on a gas/liquid interface in the form of a monomolecular film, and then compressed unidirectionally or in two directions facing each other by means of a barrier, a thin film in which the film-forming molecules have uniformly been oriented in a particular direction in the surface of the film, is formed at the gas/liquid interface, and (2) when the oriented organic thin film thus formed is transferred to a substrate by the horizontal lifting method or horizontal immersing method, the thin film transferred to the substrate exhibits an orientation-controlling action on the liquid crystal molecules.

The present inventors thus completed the present invention.

The present invention relates to an organic thin film obtained by spreading an organic substance comprising a polymer on a liquid surface, and compressing the spread substance unidirectionally or in anti-parallel direction facing each other, in which organic thin film the principal chain of said polymer in the surface of the film has been oriented perpendicularly to the direction of the compression.

Also, the present invention relates to a liquid crystal display device comprising substrates, a polarizer, electrodes at least one of which is transparent, if necessary semiconductor substrates at least one of which is transparent, an orientation-controlling film and a liquid crystal layer, among which at least one of the polarizer, electrode, semiconductor substrate, orientation-controlling film and liquid crystal layer comprises an organic thin film.

Further, the present invention relates to a liquid crystal display device of which the orientation-controlling film is an organic thin film in which film-forming molecules have uniformly been oriented in a particular direction in the surface of the film.

An object of the present invention is to provide an oriented organic thin film.

Another object of the present invention is to provide a thin and/or flexible liquid crystal display device.

A further object of the present invention is to provide a liquid crystal display device with an orientation-controlling film which requires no rubbing treatment, heat treatment nor chemicals treatment; has excellent uniformity of film thickness and can be easily formed in a large area.

Other objects and advantages of the present invention will become apparent from the following description and accompanying drawings.

BRIEF DESCRIPTION OF THE DRAWINGS

In the accompanying drawings:

FIGS. 5 and 5(a) to 5(r) show the structural formulae of the polydiacetylene derivatives used in the present invention;

FIGS. 8A to 8E are the structural formulae of the compounds used for thin film formation in Examples 3, 4, 5 and 6, respectively;

FIGS. 12A to 12C are the structural formulae of the compounds used in Example 11;

PREFERRED EMBODIMENT OF THE INVENTION

A monomolecular film or such a film, in which film-forming molecules have been uniformly oriented in a particular direction in the surface of the film (hereinafter referred simply to as monomolecular film), can be formed at a gas/liquid interface, specifically, by the following method. The film-forming molecules referred to herein mean molecules which can form a monomolecular film at a gas/liquid interface.

Figure 1:
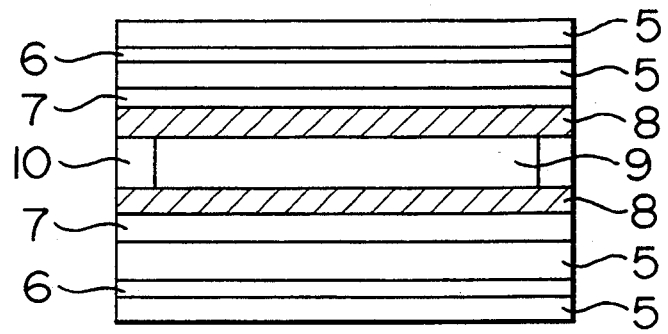
FIG. 1 is a sectional view of the main part of the conventional liquid crystal display device.
Figure 2A:
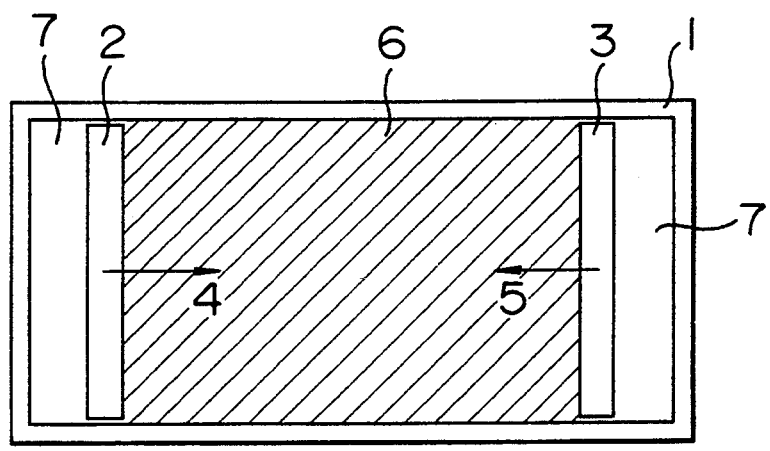
FIGS. 2A and 2B are schematic views of an apparatus for producing the orientation-controlling film of the present invention, the former being a plan view of the apparatus and the latter being a side sectional view of the apparatus.
Figure 2B:
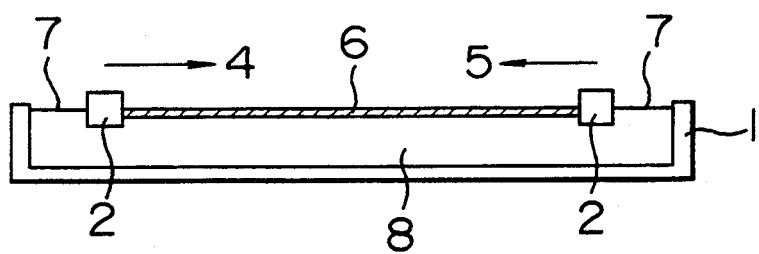

FIGS. 2A and 2B are schematic views of one example of apparatus for producing a polarizer, orientation-controlling film, liquid crystal layer, electrode, semiconductor substrate, etc. used in the liquid crystal display device of the present invention. FIG. 2A is a plan view of the apparatus, and FIG. 2B is a side sectional view thereof. In FIG. 2A, 1 is a trough, 2 and 3 are compression barriers, 4 and 5 are the opposing movement directions of each compression barrier (direction of compression), 6 is a water surface on which the film-forming molecules are spread, 7 is a clean water subphase, and 8 is a water phase. First, the barriers 2 and 3 are moved to the left and right ends, respectively, of the trough to enlarge the area of the water surface 6. In this condition, the film-forming molecules are spread on the water surface 6 in the form of monomolecular film. The barriers 2 and 3 are slowly moved toward the right and left, respectively, to compress the spread film on the water surface 6. The movement of the barriers is stopped at the point of time when the surface pressure of the spread film reaches a definite value. If the film is composed of the film-forming substance used in the present invention, the film-forming molecules are uniformly oriented, in this condition, in a particular direction in the surface of the film. FIGS. 2A and 2B show a form of bidirectional compression of the spread film on the gas/liquid interface, but the same result can be also obtained with a unidirectional compression manner frequently seen in the common LB film-forming apparatus.

Figure 3A:
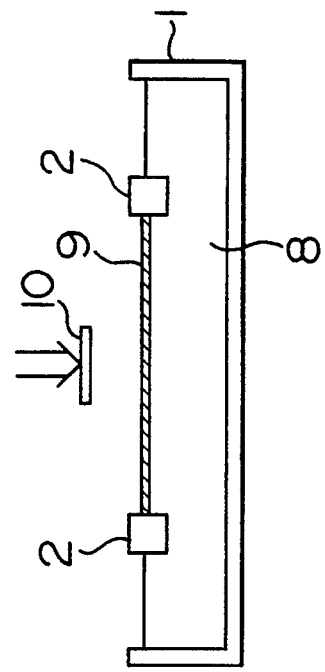
FIGS. 3A to 3C are a diagram illustrating a procedure for transferring an organic thin film from a gas/liquid interface to a substrate by the horizontal lifting method.
Figure 3B:
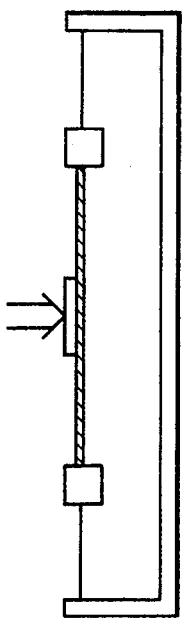
Figure 3C:
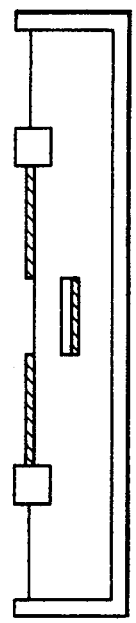
Figure 4A:
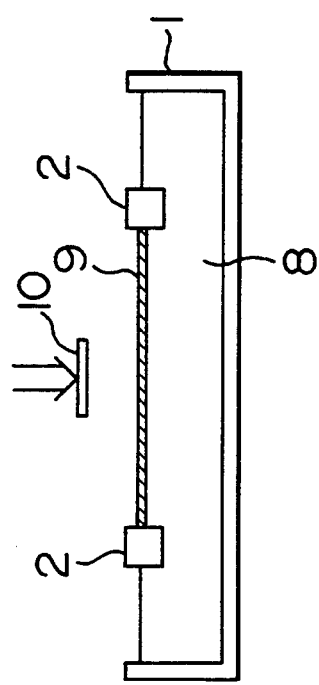
FIGS. 4A to 4C are a diagram illustrating a procedure for transferring an organic thin film from a gas/liquid interface to a substrate by the horizontal immersing method.
Figure 4B:
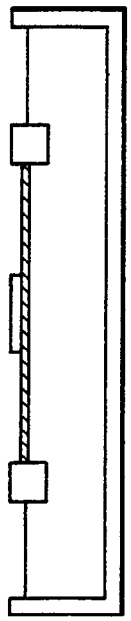
Figure 4C:
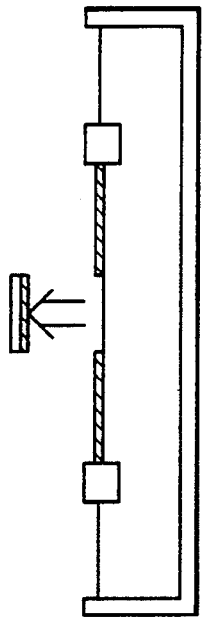

The oriented film formed at the gas/liquid interface by the above procedure can be transferred, without being disturbed in the orientational order and orderliness, to a substrate by the horizontal lifting method shown in FIGS. 3A to 3C or the horizontal immersing method shown in FIG. 4A to 4C. In FIGS. 3A to 3C and FIGS. 4A to 4C, 9 is an oriented film formed on the water surface, 10 is a substrate, and other symbols are the same as those in FIGS. 2A and 2B. In the horizontal lifting method (FIGS. 3A to 3C), the substrate held nearly horizontally is slowly moved down, and as soon as its surface is brought into contact with the film on the water surface, it is slowly moved up in turn. At that time, the film on the water surface is transferred to the substrate. In the horizontal immersing method (FIGS. 4A to 4C), the substrate as held nearly horizontally is slowly moved down and further submerged after brought into contact with the film on the water surface. At that time, the film on the water surface is transferred to the substrate. By repeating the procedure of FIGS. 3A to 3C or FIGS. 4A to 4C, the oriented film formed on the water surface can be deposited in any number of layers on the substrate.

A first embodiment of the present invention is an organic thin film obtained by spreading an organic substance comprising a polymer on a liquid surface and compressing the spread substance unidirectionally or in anti-parallel direction facing each other, in which organic thin film the principal chain of the polymer in the surface of the film has been oriented perpendicular to the direction of compression.

The above-mentioned polymer preferably comprises the polymer in which either or both of the principal chain and side chain contain at least one member selected from the group consisting of the structure of

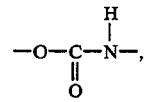

the structure of

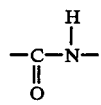

and the structure of

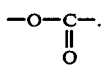

Further, the above-mentioned polymer preferably comprises a polydiacetylene derivative represented by the formula (0),

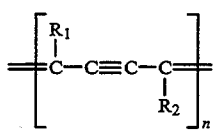

wherein $R_1$ and $R_2$ represent independently a side-chain substituent. In the above polydiacetylene derivative, each of the side-chain substituents $R_1$ and $R_2$ preferably has the structure represented by the formula:

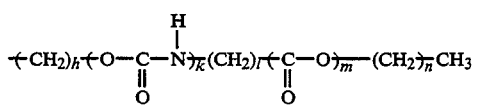

wherein h is 2 to 18, k is 0 or 1, l is 1 to 18, m is 0 or 1 and n is 0 to 18, all being an integer.

Still further, the above polymer preferably comprises at least one member selected from the group consisting of the polymers represented by the following formulae (1) to (8):

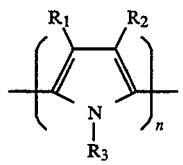

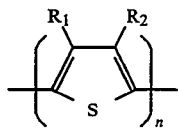

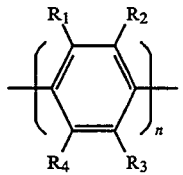

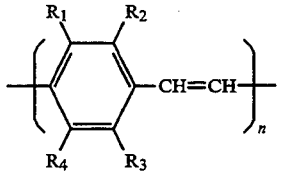

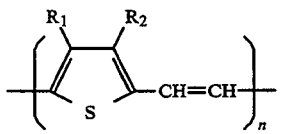

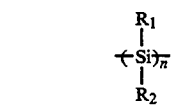

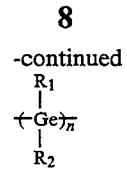

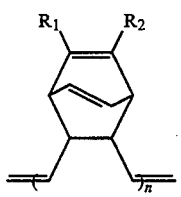

wherein $R_1$, $R_2$, $R_3$ and $R_4$ are independently a side-chain substituent. In the above formulae, (1) is a polypyrrole derivative, (2) is a polythienylene derivative, (3) is a poly-p-phenylene derivative and its precursor polymer, (4) is a poly-p-phenylen vinylene derivative and its precursor polymer, (5) is a polythienylene vinylene derivative and its precursor polymer, (6) is a polysilane derivative, (7) is a polygermane derivative and (8) is a derivative of a polyacetylene precursor.

It is preferred for the organic thin film comprising the above polymer to keep electrically active conductivity or semiconductivity by itself or by doping.

At least one of the side-chain substituents, $R_1$, $R_2$, $R_3$ and $R_4$, of the above polymers is preferably either an alkyl group having six or more carbon atoms or an alkyl group containing at least one member selected from the group consisting of a hydroxyl group, amino group, phosphoric acid group, ether group, ester group, peptide group and urethane group.

The above polymer may be a mixture or copolymer of the above polydiacetylene derivative with one or more members selected from the group consisting of the foregoing polypyrrole derivative (1), polythienylene derivative (2), poly-p-phenylene derivative and its precursor polymer (3), poly-p-phenylene vinylene derivative and its precursor polymer (4), polythienylene vinylene derivative and its precursor polymer (5), polysilane derivative (6), polygermane derivative (7), and the derivative of a polyacetylene precursor (8).

A second embodiment of the present invention is an organic thin film comprising a plural number of layers of the thin film in which an organic substance is oriented in a particular direction in the surface of the film and which is obtained by spreading the organic substance on a liquid surface and compressing the spread substance unidirectionally or in anti-parallel direction facing each other, each layer comprising at least two kinds of organic substances or constituent organic substances being different between adjacent layers.

The above organic substance may comprise a mixture of either one of the above polymers and an organic compound or a dyestuff.

The above organic compound may have at least one of an electron-donating and electron-attractive structures, whereby the organic thin film keeps electrically active conductivity or semiconductivity.

The above organic compound may be a porphyrin derivative or a phthalocyanine derivative, whereby the organic thin film keeps electrically active conductivity or semiconductivity, or photoelectric conversion characteristics.

The above organic compound may be a material having second-order or third-order non-linear optical characteristics. The above material having the non-linear optical characteristics may be at least one member selected from the group consisting of an acetylene derivative represented by the formula (I):

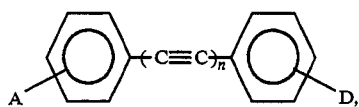
(I)

an ethylene derivative represented by the formula (II):

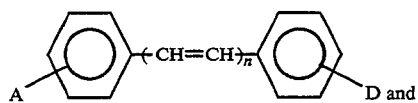
(II)

(II) and a diazobenzene derivative represented by the formula

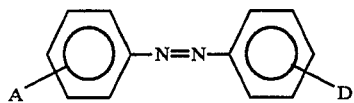
(III)

wherein D is an electron-donating substituent, A is an electron-attractive substituent, and n is 1 or 2.

It is preferred that the electron-donating substituent D of the above acetylene, ethylene and diazobenzene derivatives has one or more of a hydroxyl, amino, methyl or methoxy group.

It is preferred that the electron-attractive substituent A of the above acetylene, ethylene and diazobenzene derivatives has one or more of a cyano, carboxyl, nitro, phosphoric acid or sulfonyl group.

The above organic compound may be a diacetylene derivative.

By irradiating the organic thin film comprising the above diacetylene derivative with ultraviolet ray, γ ray or electron beam or heat-treating the organic thin film, the diacetylene derivative can be polymerized into polydiacetylene. When the organic thin film is in contact with a thin film comprising other organic molecules (underlying thin film), the orientation direction of the principal chain of polydiacetylene agrees with the molecular arrangement of the underlying thin film.

A third embodiment of the present invention is a method for producing an organic thin film (hereinafter referred also to as oriented organic thin film-manufacturing method) comprising the steps of spreading an organic substance on a liquid surface to form a thin film at the gas/liquid interface; compressing the resulting thin film unidirectionally or in anti-parallel direction facing each other to orient the organic substance in a particular direction in the surface of the film at the interface; and then transferring the oriented thin film to a solid substrate by the horizontal lifting method or horizontal immersing method.

In transferring the oriented organic thin film to the solid substrate, it is preferred to control the in-plane orientation direction of the film while monitoring the in-plane orientation direction and the degree of completeness thereof by measuring reflection spectrum or absorption spectrum using linearly polarized light during the formation of the film on the liquid surface.

By repeating this transferring process at least twice or more, a multi-layer structure may be formed, in which the orientation direction may be regulated for every layer.

An organic substance which is the same as or different from the above organic substance may further be deposited on the organic thin film formed by the above manufacturing method to orient that organic substance in a particular direction.

It is preferred for the organic substance to be deposited by at least one of a vacuum evaporation method, molecular beam epitaxy method, cluster ion beam method, ion beam evaporation method, ion plating method, photo CVD method and plasma CVD method. Further, the deposition of the organic substance may be carried out by at least one of a dipping method, spraying method, spin-coating method, casting method and electrodeposition method, using a solution of the organic substance in an organic or inorganic solvent.

After the deposition of the organic substance, it is more preferred to heat the deposited organic thin film at a temperature lower than the melting point of the substance.

For example, when butoxycarbonylmethylurethane series polydiacetylene, p-3BCMU, represented by the formula (a) in FIG. 5, which is a one-dimensional chain polymer having a good crystallization property and soluble in organic solvents, is spread at a gas/liquid interface and compressed unidirectionally or in two directions facing each other, it can be turned into a thin film which has uniformly been oriented so that the direction of the principal chain is perpendicular to the direction of compression. This thin film is an ultra thin film of about 20 Å to about 40 Å in thickness having a large area of about several tens $cm^2$ and a uniform molecular orientation.

The foregoing oriented organic thin film-manufacturing method may be thought to be widely applicable to the whole polymers having a particular functional group at the principal chain or side chain and being soluble in organic solvents.

Such polymers having a particular functional group at the principal chain or side chain and being soluble in organic solvents include various polymeric materials expected as electroconducting or semiconducting electronic materials and non-linear optical materials. For example, there are mentioned the foregoing polymers such as (0) polydiacetylene derivatives, (1) polypyrrole derivatives, (2) polythienylene derivatives, (3) poly-p-phenylene derivatives and their precursor polymers, (4) poly-p-phenylene vinylene derivatives and their precursor polymers, (5) polythienylene vinylene derivatives and their precursor polymers, (6) polysilane derivatives, (7) polygermane derivatives, and (8) derivatives of polyacetylene precursor polymers.

The above particular functional group includes an alkyl group having six or more carbon atoms and an alkyl group containing at least one member selected from the group consisting of a hydroxyl group, amino group, phosphoric acid group, ether group, ester group, peptide group and urethane group. By having such a functional group, the polymers become soluble in organic solvents and spreadable at a gas/liquid interface.

The above oriented organic thin film-manufacturing method can be applied not only to the above polymers, but also to other polymers and low molecular weight compounds having structural anisotropy which cannot form good oriented thin films by themselves. In other words, good oriented organic thin films can be formed by mixing the above one-dimensional chain polymers which act as an orientation supporter and the above other polymers or low molecular weight compounds having a structural anisotropy.

As examples of the low molecular weight compound having a structural anisotropy, there are mentioned dyes represented by cyanine dyes, merocyanine dyes, etc.; porphyrin derivatives and phthalocyanine derivatives having a photoelectric conversion function; polycyclic aromatic compounds such as perylene, etc.; charge transfer complexes represented by tetracyanoquinodimethane.tetrathiofluvalene (TCNQ.TTF) ; and $\pi$-electron conjugated molecules having second-order or third-order non-linear optical characteristics represented by the foregoing formulae (I) to (III).

The orientational order and crystallinity of the above oriented organic thin film can be further improved by heating the thin film or giving a temperature gradient to the thin film during or after compression operation at a gas/liquid interface.

The ultra-thin oriented thin film produced at a gas/liquid interface by the above method can be transferred to a solid substrate by the horizontal lifting method or horizontal immersing method, preferably horizontal lifting method. Multi-layer thin films can also be formed by repeating this transferring operation many times.

AS the substrate used, those which are commonly used for thin film formation such as substrates made of glass, ceramics, plastics, metal, semiconductor, etc. may be used. Further, a porous membrane filter marketed from Millipore Ltd. under the trade name of "Millipore Film" and perforated films such as meshes for electron microscopic observation also can be used. Further, adhesiveness between the substrate and oriented organic thin film can also be enhanced by applying a hydrophobic or hydrophilic treatment to the surface of the above substrates.

When a multi-layer thin film is produced by the above method, it is also possible to deposit the oriented thin film formed at a gas/liquid interface, optionally regulating its orientation direction on the substrate for every layer. Usually, the principal chain of the chain-shaped polymer orients in the direction perpendicular to the compression direction at a gas/liquid interface. Consequently, if the deposition operation is carried out with the substrate turned to a desired direction, it is possible to produce a multi-layer oriented organic thin film in which the principal chain turns to a desired direction at a desired position on the substrate.

Further, by examining the orientation direction of the oriented organic thin film at a gas/liquid interface by measuring polarization absorption and reflection spectra with a linear polarized light, the orientation of molecules can be more strictly confirmed. This method is therefore useful to control the orientation of mixtures containing a low molecular weight compound.

Such the multi-layer oriented organic thin film in itself can be utilized as a color polarizing plate, and the light transmittance of the polarizing plate can optionally be controlled by properly adjusting the number of the deposited layers. Further, an oriented organic thin films mixed with the above dye(s) can be used as a monochromatic polarizing filter by selecting a dye color having a suitable absorption wavelength.

By using the oriented organic thin film which is produced by utilizing the above oriented organic thin film-manufacturing method, as a ground substrate in the conventional thin film-manufacturing techniques, it is possible to produce the oriented organic thin film of organic substances not suitable for the above oriented organic thin film-manufacturing method. Hereupon, said conventional thin film-manufacturing techniques include dry-type thin film-manufacturing methods (e.g. vacuum evaporation method, molecular beam epitaxy method, cluster ion beam method, ion beam evaporation method, ion plating method, photo CVD method, plasma CVD method), and wet-type thin film-manufacturing methods (e.g. LB method, dipping method, spraying method, spin-coating method, casting method, electrodeposition method). To use the above oriented organic thin film produced at a gas/liquid interface as a ground substrate in various thin film-manufacturing methods, is expected to bring about an effect equivalent or more to the conventional method which promotes the epitaxial growth of organic substance on the cleavage plane of an inorganic crystal such as an alkali halide, etc. The reason for this is as follows: Since the epitaxial growth depends largely upon the matching of crystal lattice between the underlying and overlying layers, to use the crystal surface of an organic substance as the underlying layer is considered to more improve the matching of crystal lattice with the overlying organic substance than to use the inorganic crystal as the underlying layer as in the conventional method. It is desirable that the organic substance used as the underlying layer is the same kind as the overlying organic substance, but the both may be different from each other. Consequently, by using the oriented organic thin film as the ground substrate as in the present invention, it is possible to greatly improve the matching of crystal lattice with the overlying organic substance.

Particularly, the polydiacetylene compounds shown in FIG. 5, expected as organic non-linear optical materials, are good examples of the compound the crystal growth of which depends largely upon the matching and epitaxial property of lattice, because solid-phase polymerization of a diacetylene monomer into polydiacetylene is a topochemical polymerization strictly controlled by the steric configuration of monomer crystal lattice. When such the solid-phase polymerization is possible, an oriented monomer thin film can be formed on the thermally stable oriented polymer thin film, and further other oriented polymer thin films can be obtained by subjecting the monomer thin film to polymerization.

Further, the oriented organic thin film-manufacturing method of the present invention is useful to form the oriented thin films of porphyrin derivatives and phthalocyanine derivatives expected as photoelectric conversion materials as well as those of the low-molecular-weight diacetylene derivatives expected for second-order and third-order non-linear effects.

As is known by conventional studies on the epitaxial growth of inorganic substances, the formation of the epitaxial film of organic molecules on the oriented organic thin film also requires proper control of the inner energy of the molecules before deposition to the substrate, substrate temperature, etc. in order to promote a good epitaxial growth. However, there is a rare case in which the epitaxial film is not obtained when methods such as the vacuum evaporation method, molecular beam epitaxy method, etc. are used. In such case, the formation of good oriented thin films becomes possible by heat-treating the thin film at a temperature lower than the melting point of the constituent molecule.

Next, a difference between the oriented organic thin film-manufacturing method of the present invention and the molecule oriented thin film-manufacturing method utilizing the streaming orientation effect at a gas/liquid interface (see for example Japanese Patent Application Kokai No. 63-141639) will be explained.

When the streaming orientation at a gas/liquid interface is utilized, it is generally observed that an increase in compression rate, i.e. degree of streaming, is accompanied by improvement in the orientational degree of molecule, there being a positive relationship between the degree of streaming and orientational degree. However, in the oriented organic thin film-manufacturing method of the present invention using polymers having a particular functional group at the principal chain or side chain, when the compression rate is increased to increase the streaming effect, the orientation degree Of the monomolecular film obtained tends to lower on the contrary. This fact can be well explained by the idea that in the method of the present invention, pressure-induced structural phase transition occurs in which the state of the spread polymer at the gas/liquid interface shifts with an increase in the pressure from a state wherein the polymer irregularly folds, bends and winds like chains, i.e. the state of the so-called "random coil" to a plate-like "rod" state having good crystallinity and orientational order. The reason is that the structural phase transition proceeds more homogeneously when it is carried out quasi-stationarily, but that when it is carried out suddenly, it tends to proceed heterogeneously due to supercooling phenomenon, etc. and causes the deterioration of film quality. Consequently, the fundamental mechanism of the present invention proves to be not simple streaming orientation, but the pressure-induced structural phase transition.

A fourth embodiment of the present invention is a thin and/or flexible liquid crystal display device produced by the LB method as need arises in which part or all of the constituents are composed of organic substances.

A fifth embodiment of the present invention is a liquid crystal display device with an orientation-controlling film which is superior in the uniformity of film thickness, can easily be formed in a large area and requires no rubbing treatment, heat treatment nor chemicals treatment.

By the afore-mentioned method (LB method) for forming an organic thin film by successively transferring a monomolecular film spread at a gas/liquid interface to a solid substrate, formation of at least one of (i) a transparent electrode or semiconductor substrate, (ii) a polarizer (analyzer), (iii) an orientation-controlling film and (iv) a liquid crystal layer is easily attained as shown below.

(i) Transparent Electrode or Semiconductor Substrate

In one of the liquid crystal display devices of the present invention, the transparent electrode or semiconductor substrate is readily composed, by the LB method, of a monomolecular film comprising an electro-conducting polymer such as polypyrrole, polythienylene or a charge transfer complex such as TTF.TCNQ, pyridium TCNQ complex. By using such the electro-conducting monomolecular film, a ultra-thin film having a desired electrical conductivity can be formed on a polymer film or other films. Further, the ultra-thin film can also be obtained in the form of a semiconducting organic thin film, and therefore it can be used as a driving device such as thin film transistor (TFT) and metal insulator metal (MIM) by applying fine patterns to it by lithography techniques.

(ii) Polarizer (Analyzer)

By spreading the foregoing polymers represented by the formulae (0) to (8) and the following polymers represented by the formulae (9) to (14), for example, a butoxycarbonyl urethane series polydiacetylene derivative (p-3BCMU) soluble in chloroform, etc., at a gas/liquid interface, and uniformly compressing the spread thin film unidirectionally or in anti-parallel direction facing each other, there can be obtained a monomolecular film in which the principal chain of the polydiacetylene has been oriented at a right angle to the compression direction. This oriented monomolecular film formed at the gas/liquid interface can easily be transferred to a solid substrate by the horizontal lifting method. Further, multi-layer films can be produced by repeating this operation many times.

This oriented organic thin film has absorption at 630 to 430 nm, showing a dichroic ratio of 30. It can be used as a polarizer and an analyzer.

(iii) Orientation-Controlling Film

The oriented organic thin film produced by the above organic thin film-manufacturing method can also be used as an orientation-controlling film for liquid crystal display devices. This oriented organic thin film itself can also be used as the orientation-controlling film of a liquid crystal without the rubbing treatment.

The orientation-controlling film can be formed directly on the substrate having an electrode. Further, it is also possible to form the orientation-controlling film on the electrode with an underlying or overlying inorganic insulating film comprising $SiO_2$, $Al_2O_3$ or $TiO_2$. Further, adhesiveness between the substrate and orientation-controlling film can be improved by previously applying hydrophobic treatment to the substrate surface with a silane coupling agent such as hexamethyldisilazane.

The principal chain of the polymer (a film-forming molecule) in the oriented organic thin film formed at a gas/liquid interface as described above, is usually oriented in the direction perpendicular to the compression direction and uniformly over the whole surface. Consequently, if the deposition operation is carried out with the substrate turned to a desired direction, it is possible to produce an orientation-controlling film on the substrate in which the principal chain turns to the desired orientation direction.

The polymer, a film-forming substance, used in the present invention includes polymers represented by the formulae (0) to (14):

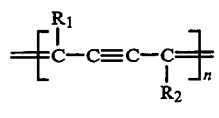 (0)

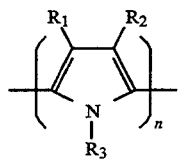 (1)

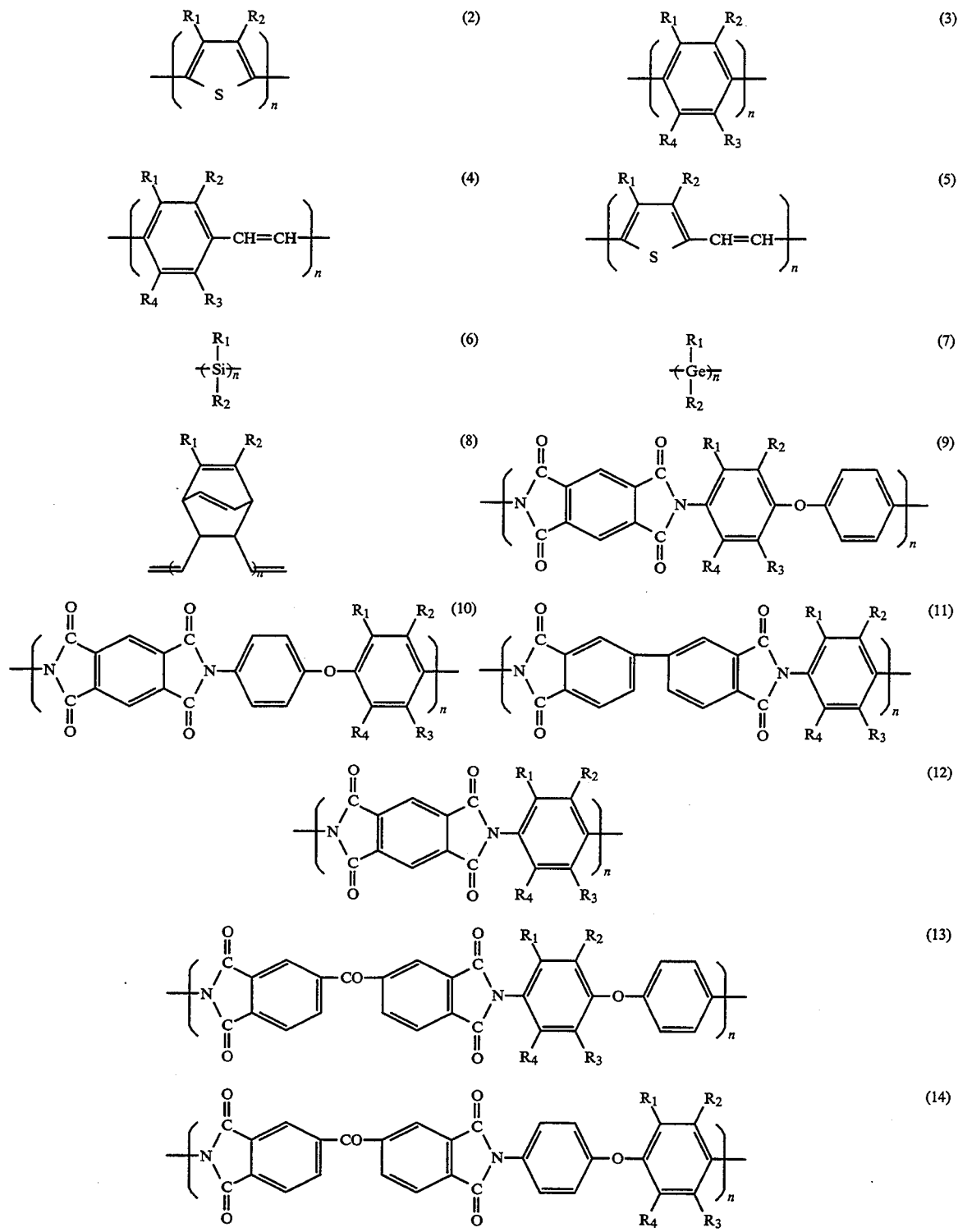

wherein substituents $R_1$, $R_2$, $R_3$ and $R_4$ independently represent a structure represented by the formula:

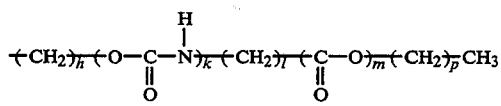

wherein h is 2 to 18, k is 0 or 1, l is 1 to 18, m is 0 or 1 and p is 0 to 18.

The polymers or compounds used in the present invention are not limited to those represented by the above formulae (0) to (14), but may be any of those which are soluble in solvents, particularly organic solvents and can be spread in the form of a thin film at a gas/liquid interface, and can be uniformly oriented in a particular direction in the surface of the thin film when the thin film is compressed unidirectionally or in two directions facing each other.

Also, even a compound unsuitable for thin film formation at a gas/liquid interface can be used as a film-forming substance for the orientation-controlling film if the above oriented organic thin film is utilized as a ground film. In other words, said compound is deposited as an overlying layer on the oriented organic thin film, which is a ground film, by means such as a vacuum evaporation method, molecular beam epitaxy method, dipping method, spraying method, spinner method, casting method, etc. In this case, if there is a good matching of crystal lattice between the substance used as the ground film and that used as the overlying layer, the in-plane orientational order of the ground film can be given to the overlying layer. The oriented film comprising the ground film and overlying layer thus obtained also showed an orientation action on the liquid crystal molecule.

The orientation-controlling film can also be formed on a polymer thin film previously formed to the substrate. That is, the polymer thin film is previously formed as the ground film on the substrate by means such as a dipping method, spraying method, spinner method, casting method, etc., and then the orientation-controlling film according to the present invention is deposited thereon. The polymer thin film used as the ground film need not be oriented in the surface of the film. The rubbing treatment of the ground film also is not necessary.

(iv) Liquid Crystal Layer

Hitherto, the thickness of the liquid crystal layer is kept constant by inserting a spacer, and therefore when the liquid crystal cell is bent, the spacer slips off the place to disturb the orientation of the sealed liquid crystal. Disclination is, therefore, sometimes induced.

In the present invention, a liquid crystal layer free from such a problem can be produced by sealing a liquid crystal in a polymer film having a constant thickness and pores of an area of several tens $\mu m_2$.

Concretely speaking, by casting a mixed solution of the polymer and liquid crystal in an organic solvent on the gas/liquid interface and then vaporizing the solvent, a self-standing liquid crystal composite film having a thickness of about several tens $\mu m$ can be produced (Chem. Lett., 813 (1989)).

Alternatively, the liquid crystal layer can also be produced by a method of impregnating a perforated net-like film such as a porous membrane filter marketed from Millipore Ltd. under the trade name of Millipore Filter with a liquid crystal, and a method of applying a photoresist technique to a transparent polymer film to form a fine and uneven matrix pattern of about several tens $\mu m$ and then sealing the liquid crystal into this film.

The liquid crystal used in the liquid crystal display device of the present invention can be selected from a fairly wide range, if it shows a nematic phase or smectic phase in a working temperature range. The liquid crystal includes compounds shown in Table 1, their derivatives and mixtures thereof.

TABLE 1

| Kind | Structural formula |
| --- | --- |
| Cyclohexylcyclo-hexane series | R'—⟨cyclohexyl⟩—⟨cyclohexyl⟩—X |
| Phenylcyclo-hexane series | R'—⟨cyclohexyl⟩—⟨phenyl⟩—X |
| Biphenyl series | R'—⟨phenyl⟩—⟨phenyl⟩—X |
| Terphenyl series | R'—⟨phenyl⟩—⟨phenyl⟩—⟨phenyl⟩—X |
| Cyclohexyl cyclohexanoate series | R'—⟨cyclohexyl⟩—COO—⟨cyclohexyl⟩—X |
| Phenylcyclo-hexyl carboxylate series | R'—⟨cyclohexyl⟩—COO—⟨phenyl⟩—X |
| Ester series | R'—⟨phenyl⟩—COO—⟨phenyl⟩—X |

TABLE 1-continued

| Kind | Structural formula |
|---|---|
| Diester series | R'–⟨C₆H₄⟩–COO–⟨C₆H₄⟩–COO–⟨C₆H₄⟩–X |
| | X–⟨C₆H₄⟩–COO–⟨C₆H₄⟩–COO–⟨C₆H₄⟩–R' |
| Biphenylcyclo-hexyl carboxylate series | R'–⟨C₆H₁₀⟩–COO–⟨C₆H₄⟩–⟨C₆H₄⟩–X |
| Biphenyl ester series | R'–⟨C₆H₄⟩–⟨C₆H₄⟩–COO–⟨C₆H₄⟩–X |
| | X–⟨C₆H₄⟩–⟨C₆H₄⟩–COO–⟨C₆H₄⟩–R' |
| Thioester series | R'–⟨C₆H₄⟩–COS–⟨C₆H₄⟩–X |
| Schiff series | R'–⟨C₆H₄⟩–CH=N–⟨C₆H₄⟩–X |
| | X–⟨C₆H₄⟩–CH=N–⟨C₆H₄⟩–R' |
| Pyrimidine series | R'–⟨C₆H₄⟩–⟨pyrimidine⟩–X |
| | R'–⟨pyrimidine⟩–⟨C₆H₄⟩–X |
| | R'–⟨C₆H₄⟩–⟨pyrimidine⟩–X |
| | R'–⟨pyrimidine⟩–⟨C₆H₄⟩–X |
| Dioxane series | R'–⟨dioxane⟩–⟨C₆H₄⟩–X |

TABLE 1-continued

| Kind | Structural formula |
|---|---|
| Cyclohexyl methyl ether series | R'—⟨cyclohexyl⟩—CH$_2$O—⟨phenyl⟩—X |
| | R'—⟨cyclohexyl⟩—CH$_2$O—⟨phenyl⟩—⟨phenyl⟩—X |
| Cinnamonitrile series | R'—⟨cyclohexyl⟩—⟨phenyl⟩—CH=CH—X |

In Table 1, R' represents alkyl or alkoxyl, and X represents cyano, nitro or halogen.

In the liquid crystal display devices of the present invention, when the liquid crystal is a nematic one, its molecules enclosed between two substrates can take any of the following alignment forms:

(1) Homogeneous alignment in which the long axes of the liquid crystal molecules are uniaxially aligned parallel to the substrate surface.

(2) Twisted alignment in which the long axes of the liquid crystal molecules are twisted by 80 to 280 degrees between two substrates.

The ferroelectric liquid crystals as shown below also can be used as the liquid crystal:

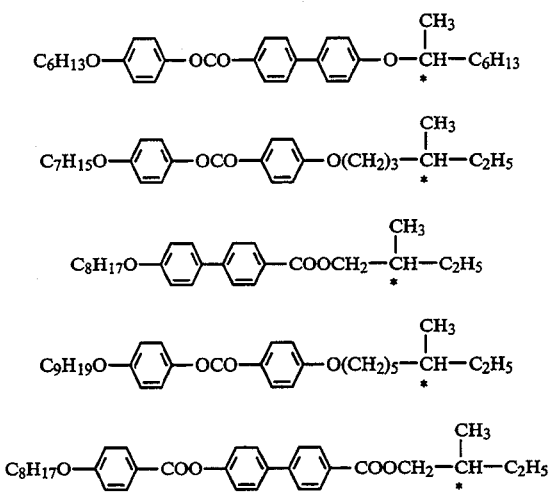

The orientation-controlling film according to the present invention is characterized in that the polymer constituting the film is uniformly oriented in a particular direction in the film surface. Such the uniform orientation of the molecule in the surface of the film may be presumed to be one of factors causing the orientation action on liquid crystal molecules.

By producing at least one of the transparent electrode or semiconductor element, polarizer (analyzer), orientation-controlling film and liquid crystal layer in such a manner as described in (i) to (iv) and using a polymer film as substrate, there is obtained a thin and/or flexible liquid crystal display device in which part or all of the constituent are composed of organic substances.

This thin and flexible liquid crystal display device can be produced in not only transparent forms, but also reflective forms. Also, this device can be stuck on windows, fences, partitions between two rooms, doors, blinds, front panel of automobile displays, sunroofs, illuminators, displays, show windows, mirrors, toys, etc.

Particularly, by producing the orientation-controlling film in a manner described in (iii), it can be incorporated into the liquid crystal display device without the rubbing treatment, heat treatment and chemicals treatment. Also, such the orientation-controlling film is superior in the uniformity of film thickness and also can easily be produced in a large area.

EXAMPLE 1

As a one-dimensional chain polymer soluble in organic solvents, was used a polydiacetylene derivative (hereinafter referred to as p-3BCMU) of which the side-chain substituent is an alkyl chain containing a urethane and ester moieties and which is represented by the structural formula shown in FIG. 5(a). Both $R_1$ and $R_2$ in FIG. 5 are a side-chain substituent of the polydiacetylene derivative. This p-3BCMU is a polymer having an average chain length of about 1 μm and being soluble in chloroform. A 0.5 g/l chloroform solution of this polymer was prepared, and several drops of the solution were spread on pure water contained in a trough of the LB film-manufacturing apparatus. After chloroform completely volatilized, the spread film was compressed in two directions facing each other at a compression rate of 100 cm$^2$/min to hold the monomolecular film at a surface pressure of 20 mN/m.

Figure 6:
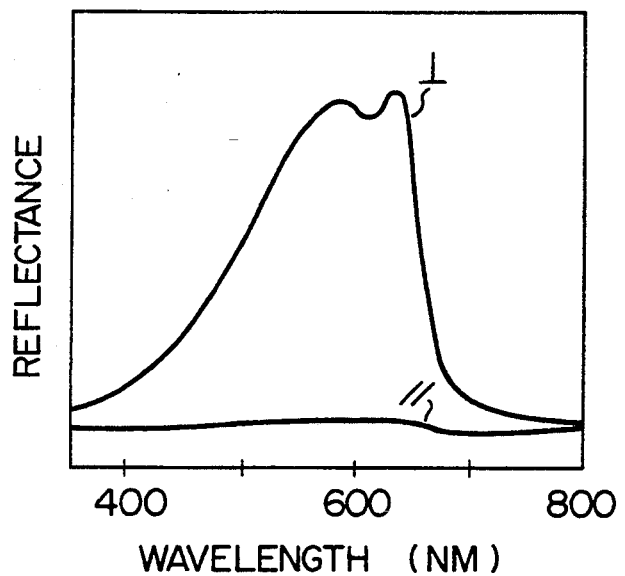
FIGS. 6 and 7 are polarization spectra of the films obtained in Examples 1 and 2, respectively.

The in-plane orientational order of the p-3BCMU monomolecular film thus produced on the water surface was evaluated by measuring a polarized reflection spectrum. The measurement with polarized light was carried out by employing linearly polarized light vertically incident on the monolayer on the water surface. As a result, as shown in FIG. 6, the intensity of the polarization reflection spectrum was maximum and minimum when the direction of polarization was perpendicular (⊥) to and parallel (∥) to the compression direction, respectively. Symbols ⊥ and ∥ in FIG. 6 show that the electric field vector of the linearly polarized light is perpendicular to and parallel to the compression direction, respectively. From this result, it became clear that the principal chain of p-3BCMU has been oriented perpendicularly to the compression direction. Also, it became clear that, since this polarization characteristics do not show in-plane position dependency, the principal chain has been oriented in the same direction and uniformly over the whole monomolecular film of about 60 cm² in area. Further, it became clear that the dichroic ratio at the peak of about 620 nm resulting from the π-π* exciton of the one-dimensional principal chain of this polydiacetylene, p-3BCMU, was about 20.

The oriented organic thin film of p-3BCMU produced at the air/water interface could easily be transferred to glass, quartz, ITO and silicon substrates, previously subjected to hydrophobic treatment with hexamethyldisilazane, which is one of the silane coupling agents, by the horizontal lifting method or horizontal immersing method. The p-3BCMU oriented organic thin film formed on any of these substrates was a good-quality film of about 27 Å in thickness retaining a high orientational order of p-3BCMU.

EXAMPLE 2

As a one-dimensional chain polymer soluble in organic solvents, was used a polydiacetylene derivative (hereinafter referred to as p-4BCMU) having a similar side-chain substituent to that of p-3BCMU used in Example 1 and an average chain length of about 1 μm and being soluble in chloroform. The structural formula of this compound is shown in FIG. 5(b). A 0.5 g/l chloroform solution of this polymer was prepared, and several drops of the solution were spread on pure water contained in a spreading vessel of the LB film-manufacturing apparatus. After chloroform completely volatilized, the spread film was compressed in two directions facing each other at a compression rate of 100 cm²/min to hold the monomolecular film at a surface pressure of 20 mN/m.

Figure 7:
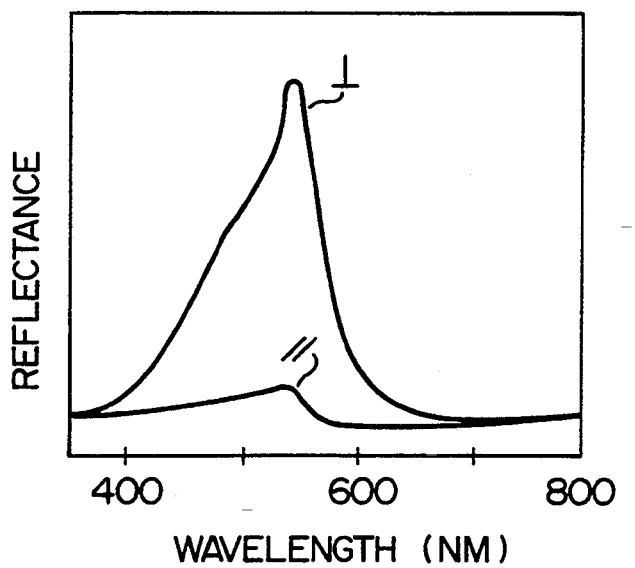

The in-plane orientational order of the p-4BCMU monomolecular film thus produced on the water surface was evaluated by measuring a polarized reflection spectrum in the same manner as in Example 1. As a result, as shown in FIG. 7, the intensity of the polarization reflection spectrum was maximum and minimum when the direction of polarization was perpendicular (⊥) to and parallel (∥) to the compression direction, respectively, in the similar manner to the case of p-3BCMU in Example 1. Symbols ⊥ and ∥ in FIG. 7 show that the electric field vector of the linearly polarized light is perpendicular to and parallel to the compression direction, respectively. From this result, it became clear that the principal chain of p-4BCMU has been oriented perpendicularly to the compression direction. Also, it became clear that, since this polarization characteristics do not show in-plane position dependency, the principal chain has been oriented in the same direction and uniformly over the whole monomolecular film of about 40 cm² in area. Further, it became clear that the dichroic ratio at the peak of about 540 nm resulting from the π-π* exciton of the one-dimensional principal chain of this polydiacetylene, p-4BCMU, was about 10.

The oriented organic thin film of p-4BCMU produced at the air/water interface could easily be transferred to glass, quartz, ITO and silicon substrates, previously subjected to hydrophobic treatment with hexamethyldisilazane, by the horizontal lifting method or horizontal immersing method. The p-4BCMU oriented organic thin film formed on any of these substrates was a good-quality film of about 31 Å in thickness retaining a high orientational order.

EXAMPLE 3

As the film-forming substance was used a mixture of poly(3-hexadecylthienylene) (hereinafter referred to as PHDT) having as the side-chain substituent an alkyl chain represented by the structural formula of FIG. 8A and a polydiacetylene derivative (p-3BCMU) used in Example 1. Both these polymers were a polymer having an average chain length of about 1 μm and being soluble in chloroform. A chloroform solution of the 1:1 mixture of these polymers was prepared, and several drops of the solution were spread on pure water contained in the trough of the LB film-manufacturing apparatus. After chloroform completely volatilized, the spread film was compressed in two directions facing each other at a compression rate of 100 cm²/min to hold the monomolecular film at a surface pressure of 20 mN/m.

The in-plane orientational order of the mixed monomolecular film thus produced on the water surface was evaluated by measuring a polarized reflection spectrum in the same manner as in Example 1. As a result, the intensity of the polarization reflection spectrum was maximum and minimum when the direction of polarization was perpendicular (⊥) to and parallel (∥) to the compression direction, respectively. From this result, it became clear that both the principal chains of these one-dimensional chain polymers have been oriented at a right angle to the compression direction. Also, it became clear that, since this polarization characteristics do not show in-plane position dependency, the principal chains have been oriented in the same direction and uniformly over the whole monomolecular film of about 50 cm² in area.

Ten layers of the oriented organic thin film of the mixture thus produced on the air/water interface were deposited one upon another on a quartz substrate, previously subjected to hydrophobic treatment, by the horizontal lifting method so that the orientation directions of the principal chains were the same. Further, the polarized absorption spectrum of the oriented organic thin film of the mixture deposited on the substrate was measured to find that the dichroic ratio at the absorption peak of about 620 nm resulting from the π-π* exciton of the one-dimension principal chain of p-3BCMU was about 6, and that the dichroic ratio at the absorption peak of about 490 nm resulting from the π-π* transition of the one-dimensional principal chain of PHDT was about 3.

On exposing the above oriented thin film of the mixture to iodine vapor, it was found that the in-plane electric conductivity increased, and that the electrical conductivity in the orientation direction of the polymer principal chain were a value of about $10^{-2}$ S/cm, which was larger by about one order than that in the direction normal to the orientation direction.

EXAMPLE 4

As the film-forming substance was used a mixture of the precursor polymer of a polyphenylene vinylene derivative represented by the structural formula of FIG. 8B and the polydiacetylene derivative (p-3BCMU) used in Example 1. Both these polymers were a polymer having an average chain length of about 1 μm and being soluble in chloroform. A chloroform solution of the 1:1 mixture of these polymers was prepared, and several drops of the solution were spread on pure water contained in the trough of the LB film-manufacturing apparatus. After chloroform completely volatilized, the spread film was compressed in two directions facing each other at a compression rate of 100 cm$^2$/min to hold the monomolecular film at a surface pressure of 20 mN/m.

The in-plane orientational order of the mixed monomolecular film thus produced on the water surface was evaluated by measuring a polarized reflection spectrum in the same manner as in Example 1. As a result, the intensity of the polarization reflection spectrum was maximum and minimum when the direction of polarization was perpendicular ($\perp$) to and parallel ($\parallel$) to the compression direction, respectively. From this result, it became clear that both the principal chains of these one-dimensional chain-shaped polymers have been oriented perpendicularly to the compression direction. Also, it became clear that, since this polarization characteristics do not show in-plane position dependency, the principal chains have been oriented in the same direction and uniformly over the whole monomolecular film of about 50 cm$^2$ in area.

Twenty layers of the oriented organic thin film of the mixture produced on the air/water interface were deposited one upon another on a quartz substrate, previously subjected to hydrophobic treatment, by the horizontal lifting method so that the orientation directions of the principal chains were the same. By applying heat-treatment to this oriented thin film at 150° C. for 2 hours, the above precursor could be converted to a polyphenylene vinylene derivative shown in FIG. 8C. The polarized absorption spectrum of this heat-treated oriented organic thin film was measured to find that the dichroic ratio at the absorption peak of about 620 nm resulting from the $\pi$-$\pi$* exciton of the one-dimensional principal chain of p-3BCMU was about 6, and that the dichroic ratio at the absorption peak of about 480 nm resulting from the electron transition of the one-dimensional principal chain of the polyphenylene vinylene derivative was about 4.

On exposing the above oriented thin film of the mixture to iodine vapor, it was found that the in-plane electroconductivity rose, and that the electric conductivity in the orientation direction of the polymer main chain showed a value of about 10$^{-1}$ S/cm, which was larger by about one order than that in the direction normal to the orientation direction.

EXAMPLE 5

As the film-forming substance was used a mixture of polydihexylsilane (hereinafter referred to as PDHS) having as the side-chain substituent an alkyl chain represented by the structural formula of FIG. 8D and the polydiacetylene derivative (p-3BCMU) used in Example 1. Both these polymers were a polymer having an average chain length of about 1 $\mu$m and being soluble in chloroform. A chloroform solution of the 1:1 mixture of these polymers was prepared, and several drops of the solution were spread on pure water contained in the trough of the LB film-manufacturing apparatus. After chloroform completely volatilized, the spread film was compressed in two directions facing each other at a compression rate of 100 cm$^2$/min to hold the monomolecular film at a surface pressure of 20 mN/m.

The in-plane orientational order of the mixed monomolecular film thus produced on the water surface was evaluated by measuring a polarized reflection spectrum in the same manner as in Example 1. As a result, the intensity of the polarization reflection spectrum was maximum and minimum when the direction of polarization was perpendicular ($\perp$) to and parallel ($\parallel$) to the compression direction, respectively. From this result, it became clear that both the principal chains of these one-dimensional chain polymers have been oriented perpendicularly to the compression direction. Also, it became clear that, since this polarization characteristics do not show in-plane position dependency, the principal chains have been oriented in the same direction and uniformly over the whole monomolecular film of about 50 cm$^2$ in area.

The oriented organic thin film of the mixture produced at the air/water interface could easily be transferred to glass, quartz and silicon substrates, previously subjected to hydrophobic treatment with hexamethyldisilazane, by the horizontal lifting method. Further, the polarized absorption spectrum of the oriented organic thin film of this mixture deposited on the substrates was measured to find that the dichroic ratio at the peak of about 620 nm resulting from the $\pi$-$\pi$* exciton of the one-dimensional principal chain of p-3BCMU was about 8, and that the dichroic ratio at the peak of about 370 nm resulting from the electron transition of the one-dimensional principal chain of PDHS was about 4.

EXAMPLE 6

As the film-forming substance was used a mixture of a merocyanine dye having an alkyl chain represented by the structural formula of FIG. 8E and the polydiacetylene derivative (p-4BCMU) used in Example 2. A chloroform solution containing one dye molecule per one monomer unit of the derivative was prepared, and several drops of the solution were spread on an aqueous cadmium chloride solution contained in the trough of the LB film-manufacturing apparatus. After chloroform completely volatilized, the spread film was compressed in two directions facing each other at a compression rate of 100 cm$^2$/min to hold the monomolecular film at a surface pressure of 25 mN/m.

The in-plane orientational order of the mixed monomolecular film thus produced on the water surface was evaluated by measuring a polarization reflection spectrum in the same manner as in Example 1. The intensity of the polarized reflection spectrum was maximum and minimum when the direction of polarization was perpendicular ($\perp$) to and parallel ($\parallel$) to the compression direction, respectively. Further, the dichroic ratio at the peak of about 540 nm resulting from the $\pi$-$\pi$* exciton of the one-dimensional principal chain of p-4BCMU was about 8, and that the dichroic ratio at the peak of about 600 nm resulting from the electron transition of the J-aggregate of the merocyanine dye was about 4. From this result, it became clear that both the principal chain of p-4BCMU polymer and the aggregation direction of the J-aggregate of the merocyanine dye have been oriented perpendicularly to the compression direction. Also, it became clear that, since this polarization characteristics do not show in-plane position dependency, the principal chain has been oriented in the same direction and uniformly over the whole monomolecular film of about 50 cm$^2$ in area.

The oriented organic thin film of the mixture produced at the air/water interface could easily be transferred to a quartz substrate by the horizontal lifting method. The film showed no change in film quality even after transferred to the substrate.

EXAMPLE 7

Figure 9A:
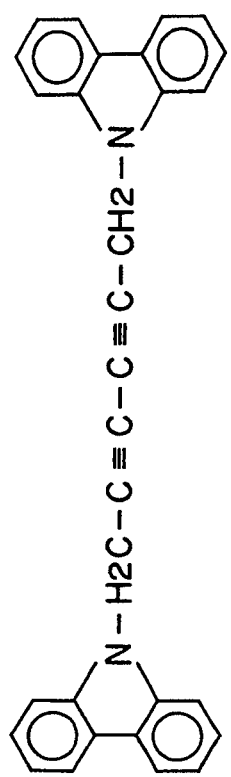
FIG. 9A is the structural formula of the compound used for thin film formation in Example 7 and FIG. 9B is a polarization spectrum of the resulting film.

On the oriented organic thin film of p-3BCMU produced on a glass substrate in the same manner as in Example 1, was deposited a diacetylene derivative shown in FIG. 9A by the vacuum evaporation method. Thus, a diacetylene monomer thin film of about 1 μm in thickness was obtained. Thereafter, the monomer was polymerized by ultraviolet irradiation to obtain a polymer thin film having an area of about 40 cm$^2$.

Figure 9B:
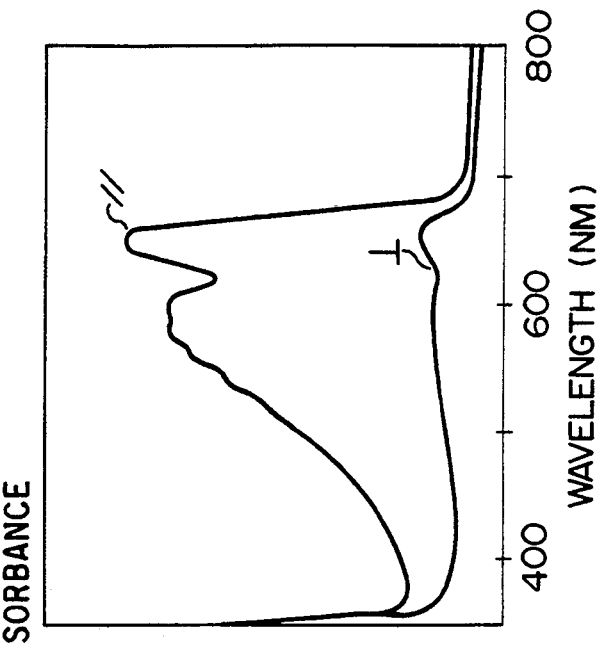

FIG. 9B shows the polarized absorption spectrum measured with a linearly polarized light of the above polymer thin film. The intensity of the absorption peak resulting from the polymer principal chain was maximum and minimum when the direction of polarization was parallel ($\parallel$) to and perpendicular ($\perp$) to the orientation direction, respectively, of the principal chain of p-3BCMU constituting the monomolecular film used as a ground film. Symbols $\perp$ and $\parallel$ in FIG. 9B shows that the electric field vector of the linearly polarized light is perpendicular to and parallel with the orientation direction, respectively, of the principal chain of the polydiacetylene constituting the ground film. Also, it was found that the dichroic ratio at the peak of about 620 nm resulting from the $\pi$-$\pi$* exciton of the one-dimensional principal chain of the polydiacetylene (p-3BCMU) was about 6. Further, it was found that, since this polarization characteristics do not show in-plane position dependency, the principal chain of p-3BCMU has been oriented in the same direction and uniformly over the whole thin film. Consequently, it was found that the overlying polydiacetylene thin film produced as above by the vacuum evaporation method was a good epitaxial film controlled by the orientation direction of the underlying p-3BCMU layer.

EXAMPLE 8

Figure 10A:
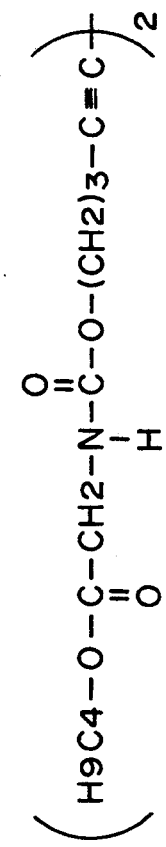
FIG. 10A is the structural formula of the compound used for thin film formation in Example 8 and FIG. 10B is a polarization spectrum of the resulting film.

On the oriented organic thin film of p-3BCMU produced on a glass substrate in the same manner as in Example 1, was deposited a diacetylene derivative (hereinafter referred to as DCH) shown in FIG. 10A by the vacuum evaporation method. Thus, a diacetylene monomer thin film of about 1 μm in thickness was obtained. Thereafter, the monomer was polymerized by heat treatment at 140° C. for 6 hours to obtain a polydiacetylene (p-DCH) thin film having an area of about 40 cm$^2$.

Figure 10B:
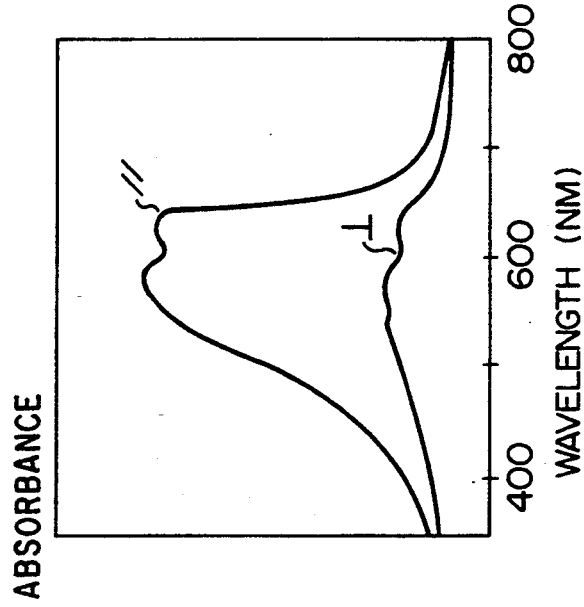

FIG. 10B shows the polarization absorption spectrum measured with a linerly polarized light of the above polydiacetylene thin film. The intensity of the absorption peak resulting from the polymer principal chain was maximum and minimum when the direction of polarization was parallel ($\parallel$) to and perpendicular ($\perp$) to the orientation direction, respectively, of the principal chain of p-3BCMU constituting the monomolecular film used as a ground film. Symbols $\perp$ and $\parallel$ in FIG. 10B shows that the electric field vector of the linearly polarized light is perpendicular to and parallel to the orientation direction, respectively, of the principal chain of the polydiacetylene constituting the ground film. Also, it was found that the dichroic ratio at the peak of about 650 nm resulting from the $\pi$-$\pi$* exciton of the one-dimensional principal chain of the polydiacetylene (p-DCH) was about 5. Further, it was found that, since this polarization characteristics do not show in-plane position dependency, the principal chain of p-DCH has been oriented in the same direction and uniformly over the whole thin film. Consequently, it was found that the overlying polydiacetylene (p-DCH) thin film produced as above by the vacuum evaporation method was a good epitaxial film controlled by the orientation direction of the underlying p-3BCMU layer.

EXAMPLE 9

Figure 11A:
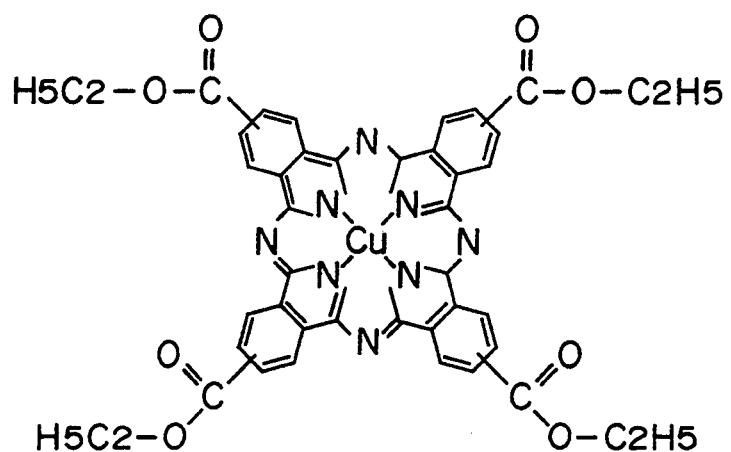
FIG. 11A is the structural formula of the compound used for thin film formation in Example 9 and FIG. 11B is a polarization spectrum of the resulting film.

On the oriented organic thin film of p-3BCMU produced on the quartz substrate in the same manner as in Example 1, was deposited a phthalocyanine derivative shown in FIG. 11A by the vacuum evaporation method. Thus, a phthalocyanine thin film having a thickness of about 0.5 μm and a film area of about 40 cm$^2$ was obtained.

Figure 11B:
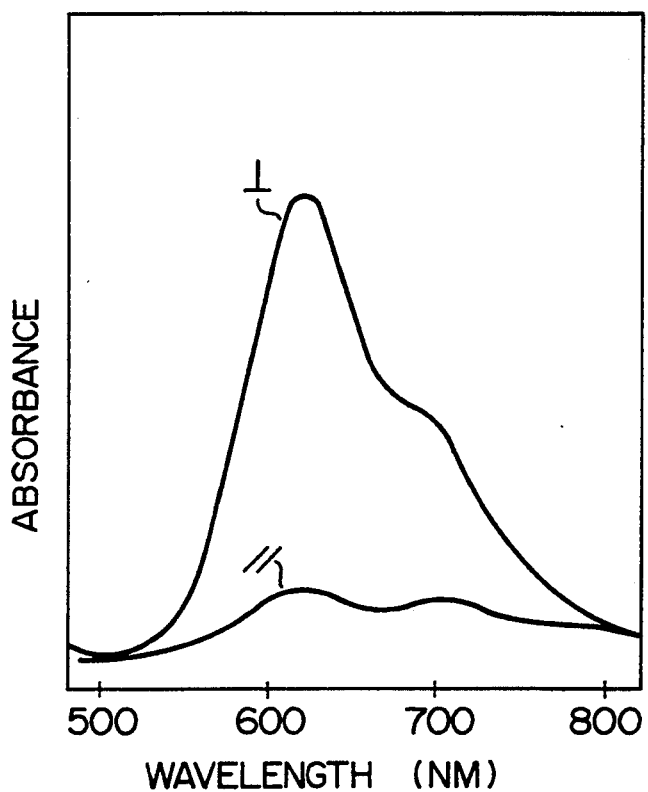

FIG. 11B shows the polarized absorption spectrum measured with a linearly polarized light of the above phthalocyanine thin film obtained. The intensity of the absorption peak of the phthalocyanine was maximum and minimum when the direction of polarization was perpendicular ($\perp$) to and parallel ($\parallel$) to the orientation direction, respectively, of the principal chain of p-3BCMU constituting the monomolecular film used as a ground film. Symbols $\perp$ and $\parallel$ in FIG. 11B shows that the field vector of linearly polarized light is perpendicular to and parallel to the orientation direction, respectively, of the principal chain of the polydiacetylene constituting the ground film. Also, it was found that the dichroic ratio at the peak of about 650 nm resulting from the $\pi$-$\pi$* excitation in the molecular surface of phthalocyanine was about 9. Further, it was found that, since this polarization characteristics do not show in-plane position dependency, this phthalocyanine thin film was a good epitaxial film in which the one-dimensional molecular column of phthalocyanine has been oriented in the same direction and uniformly over the whole thin film. Thereafter, the above thin film was heat-treated at 100° C. for 10 hours, and the polarization characteristics were again evaluated. As a result, it was found that the dichroic ratio rose to about 12, and so the epitaxial property was promoted by the heat treatment.

EXAMPLE 10

The oriented film of the polydiacetylene (p-3BCMU) having a thickness of 1 μm and a dichroic ratio of about 6 produced in Example 7 was evaluated for the third-order non-linear optical effect.

In the experiment, $\chi^{(3)}$ was evaluated by irradiating the above thin film with a laser beam of 1.9 μm in wavelength and measuring the intensity of a third harmonic wave (0.63 μm) by the Maker fringe method. As a result, the value of $\chi_{(3)}$ ($\parallel$) when the plane of polarization of the laser beam was parallel with the principal chain of p-3BCMU, was about $2 \times 10^{-10}$ esu, which was about 10 times as large as the value of $\chi^{(3)}$ ($\perp$). The similar result was obtained with the oriented thin film of the polydiacetylene (p-DCH) produced in Example 8.

EXAMPLE 11

Two pieces of a transparent polyethylene film of 500 μm in thickness and 5×5 cm in area were used as an upper and lower substrates of a liquid crystal cell. A monomolecular film consisting of a pyrrole derivative having a alkyl chain (FIG. 12A) was prepared on the liquid surface of a $1 \times 10^{-3}$M aqueous ferric chloride solution. Two layers of this monomolecular film were deposited in the form of the Y-type on one side of each polyethylene film and treated with the vapor of ferric chloride to obtain two pieces of a transparent electrode film having an electric conductivity of $10^{-2}$ S/cm.

A 0.5 g/l chloroform solution of a polydiacetylene derivative (p-3BCMU, FIG. 12B) was prepared, and several drops of the solution were spread at an air/water interface. The spread film was compressed in two directions facing each other to produce a monomolecular film in which the principal chain of the polydiacetylene has been uniformly oriented perpendicularly to the compression direction under a surface pressure of about 20 mN/m. Ten layers of this monomolecular film were deposited one upon another on the pyrrole derivative side of each transparent electrode film by the horizontal lifting method so that all the films took the same in plane orientation direction. Thus, an orientation-controlling film showing absorption at 630 to 430 nm and having a transmittance of about 50% and a dichroic ratio of about 15 was produced on each transparent electrode film. This orientation-controlling film can be used without the rubbing treatment and also has a function as a polarizing film.

Figure 13:
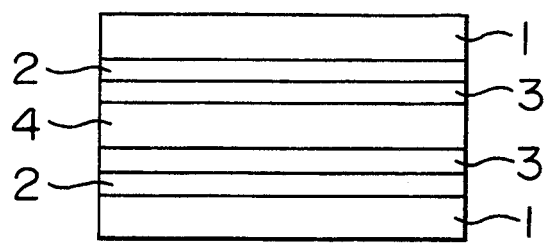
FIG. 13 is a sectional view of the liquid crystal display device in Example 11.

Polymethyl methacrylate (PMMA) and a mixed nematic liquid crystal (FIG. 12C), marketed from Merk Co. under the trade name of ZLI-1132, in a weight ratio of 2:1 were dissolved in p-xylene, and this solution was cast to an air/water interface. After 30 minutes, vaporization of p-xylene and solidification of PMMA were confirmed, and the resulting liquid crystal film was transferred, by the horizontal lifting method, onto one of the transparent electrode films with the orientation-controlling film (combining the function of a polarizing film) thereon. Further, the other transparent electrode film with the orientation-controlling film (combining the function of a polarizing film) thereon, was stuck to the other side of the above liquid crystal film so that the orientation directions of the upper and lower orientation-controlling films were almost perpendicular to each other. Thus, a liquid crystal cell of a sandwich structure having a total thickness of 2 mm or less was obtained as shown in FIG. 13. In FIG. 13, 1 is a transparent polyethylene film, 2 is an electrode comprising the pyrrole derivative, 3 is an orientation-controlling film and 4 is a liquid crystal layer.

Figure 14:
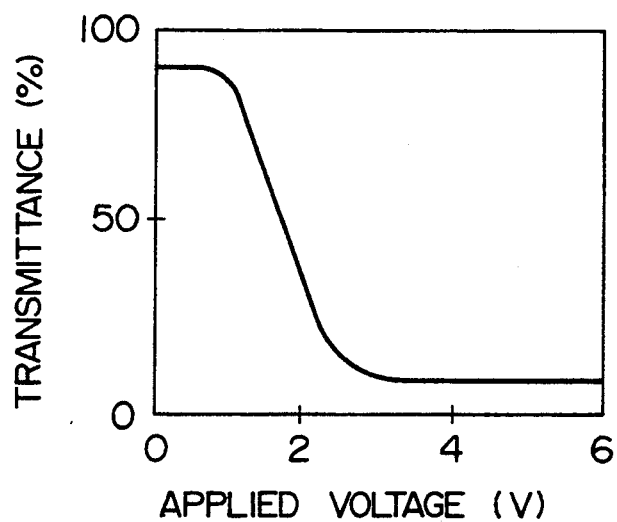
FIG. 14 is a graph showing the relationship of light transmittance vs. applied voltage of the liquid crystal display device in Example 11.

This liquid crystal cell showed a light transmittance-voltage curve as shown in FIG. 14 in which the light transmittance is high when no electric field is applied and decreases when AC electric field of 30 kHz is applied. This liquid crystal cell showed the same light transmittance-voltage characteristics as above even when held at its both ends and bent at a right angle, and also unevenness in the light transmittance was not observed over the whole cell. Consequently, it was confirmed that this liquid crystal cell is a good flexible thin-film liquid crystal display device.

EXAMPLE 12

The monomolecular film of p-3BCMU was formed on the water surface in the same manner as in Example 1. It was found that the oriented monomolecular film of p-3BCMU could be deposited in a large number of layers on a substrate by repeating the procedure shown in FIGS. 3A to 3C or FIGS. 4A to 4C. The X-ray diffraction of this multi-layer p-3BCMU film was measured to find that the film thickness per one molecular layer of the p-3BCMU film was about 27 Å.

Ten layers of the oriented monomolecular film (oriented organic thin film) of p-3BCMU formed on the water surface by the above method were deposited one upon another on a glass substrate with an ITO electrode, previously subjected to hydrophobic treatment with hexamethyldisilazane, by the horizontal lifting method so that the principal chains took the same orientation direction. In completely the same manner, another piece of a glass substrate with an ITO electrode on which ten layers of the p-3BCMU monomolecular film were deposited one upon another, was prepared. These two substrates were put opposite to each other through a spacer of 8 μm so that the p-3BCMU film of each substrate turned inward and the orientation directions of the films intersected perpendicularly to each other. Thus, a cell was obtained. Next, a nematic liquid crystal, marketed from Merk Co. under the name of ZLI-1132 as a mixture of the following four compounds, was sealed into the cell:

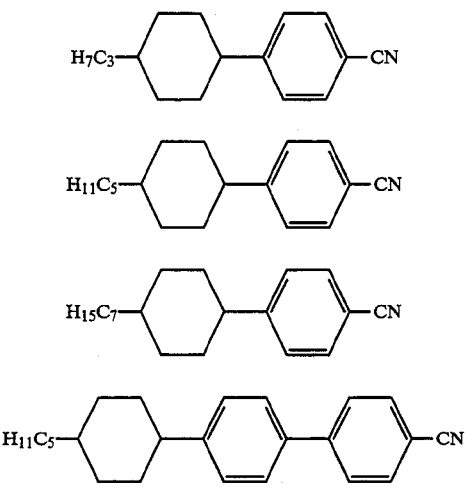

Figure 15:
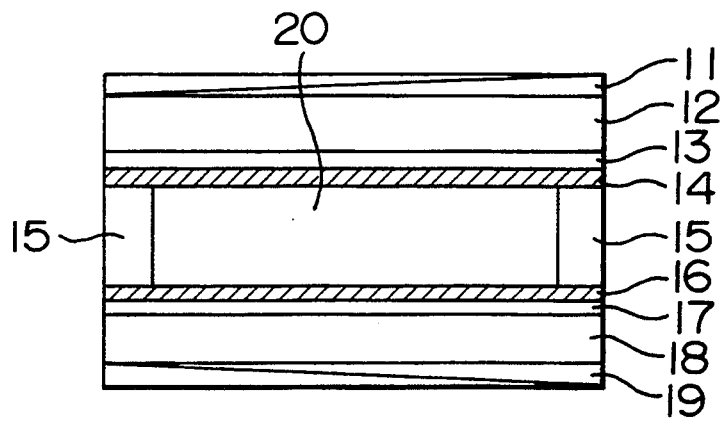
FIG. 15 is a sectional view of the liquid crystal display device in Example 12.

Further, one piece of a polarizing plate was stuck on the respective outer sides of two substrates constituting the cell. At that time, the polarization axis of each polarizing plate was regulated so that it agreed with the orientation direction of the p-3BCMU film near the plate. The schematic view of the cell in this Example will be shown in FIG. 15. In the drawing, 11 and 19 are a polarizing plate, 12 and 18 are a glass plate, 13 and 17 are an ITO electrode, 14 and 16 are a p-3BCMU film, 15 is a spacer and 20 is a liquid crystal layer.

Figure 16:
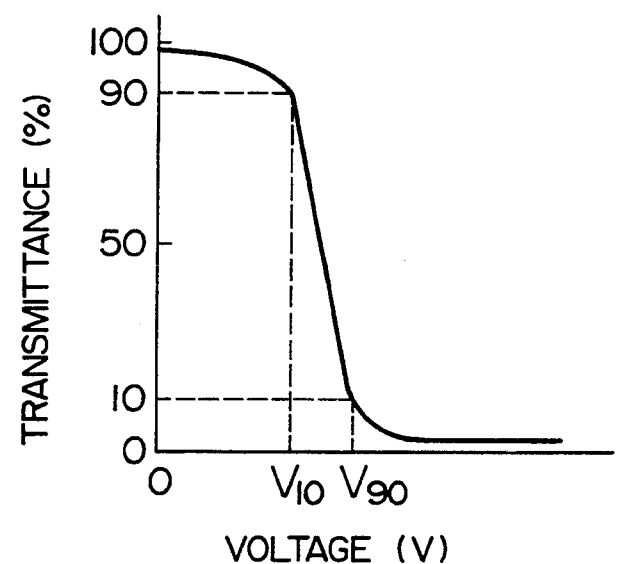
FIG. 16 is a graph showing the threshold characteristics of the liquid crystal display device in Example 12.

The liquid crystal display device thus obtained showed no unevenness of orientation, and thus a uniform liquid crystal orientation proved to have been realized. The response characteristics of this device were measured at a frequency of 32 Hz and an applied voltage of 5 V to obtain a result that the rise time was 10 ms and the decay time was 20 ms. The voltage-transmission characteristics ($\gamma = V_{90}/V_{10}$) of this device was 1.45. FIG. 16 is a graph showing the threshold voltage characteristics in terms of a relationship between voltage (V, abscissa) and transmittance (%, ordinate).

From the above results, it was found that the p-3BCMU oriented thin film formed according to the present invention shows a good orientation action on the liquid crystal molecules.

EXAMPLE 13

The same procedure was repeated as in Example 12 except that p-4BCMU was used as the film-forming molecule. It was also found that the oriented monomolecular film of p-4BCMU could be deposited in a large number of layers on a substrate in completely the same manner as in Example 12. The X-ray diffraction of this multi-layer p-4BCMU film was measured to find that the film thickness per one molecular layer of the p-4BCMU film was about 31 Å.

Next, a liquid crystal display device was produced using p-4BCMU oriented film formed by the above method as the liquid crystal orientation-controlling film. Its constitution and nematic liquid crystal used were completely the same as used in Example 12. The liquid crystal display device thus obtained showed no unevenness of orientation, and thus a uniform liquid crystal orientation proved to have been realized. Also, the electro-optical characteristics of this device were almost the same as those of the device in Example 12.

From the above results, it was found that the p-4BCMU oriented thin film formed according to the present invention shows a good orientation action on the liquid crystal molecules.

EXAMPLE 14

The monomolecular film of a mixture of PHDT and p-3BCMU was formed on a water surface in the same manner as in Example 3.

A liquid crystal display device was produced using this film as the orientation-controlling film. Its constitution and nematic liquid crystal used were completely the same as used in Example 12. The liquid crystal display device thus obtained showed no unevenness of orientation, and thus a uniform liquid crystal orientation proved to have been realized. Also, the electro-optical characteristics of this device were almost the same as those of the device in Example 12.

From the above results, it was found that the mixed oriented film of PHDT and p-3BCMU formed according to the present invention shows a good orientation action on the liquid crystal molecules.

EXAMPLE 15

The monomolecular film of a mixture of PDHS and p-3BCMU was formed in the same manner as in Example 5.

A liquid crystal display device was produced using this film as the orientation-controlling film. Its constitution and nematic liquid crystal used were completely the same as used in Example 12. The liquid crystal display device thus obtained showed no unevenness of orientation, and thus a uniform liquid crystal orientation proved to have been realized. Also, the electro-optical characteristics of this device were almost the same as those of the device in Example 12.

From the above results, it was found that the mixed oriented film of PDHS and p-3BCMU formed according to the present invention shows a good orientation action on the liquid crystal molecules.

EXAMPLE 16

On the oriented thin film of p-3BCMU produced on a glass substrate in the same manner as in Example 12 was deposited a diacetylene derivative (DCH) represented by the formula,

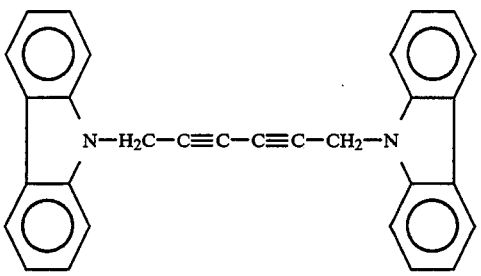

by the vacuum evaporation method. Thus, a diacetylene monomer thin film of about 1500 Å in thickness was obtained. Thereafter, the monomer was polymerized by ultraviolet irradiation to obtain a polymer (p-DCH) thin film. The polarized absorption spectrum of the polymer thin film thus produced was measured to find that the intensity of the absorption peak resulting from the polymer principal chain was maximum and minimum when the polarization direction was parallel to and perpendicular to the orientation direction, respectively, of the principal chain of the p-3BCMU monomolecular film used as a ground film. The dichroic ratio at the absorption peak of about 650 nm resulting from the p-DCH principal chain was about 5. It was found that, since this polarization characteristics do not show in-plane position dependency, the principal chain of p-DCH has been oriented in the same direction and uniformly over the whole thin film. From the above results, it was found that the orientational order of the p-DCH thin film produced on the p-3BCMU monomolecular film by the vacuum evaporation method was controlled by the orientational order of the p-3BCMU thin film used as a ground film.

Next, a liquid crystal display device was produced using as the orientation-controlling film the poly-DCH oriented film produced on the p-3BCMU oriented thin film by the above method. Its constitution and nematic liquid crystal used were completely the same as used in Example 12. The liquid crystal display device thus obtained showed no unevenness of orientation, and thus a uniform liquid crystal orientation proved to have been realized. Also, the electro-optical characteristics of this device were almost the same as those of the device in Example 12.

From the above results, it was found that the p-DCH oriented thin film formed according to the present invention shows a good orientation action on the liquid crystal molecules.

EXAMPLE 17

4,4'-Diaminodiphenyl ether represented by the formula (15) and pyromellitic acid dianhydride represented by the formula (16) were polymerized in N-methyl-2-pyrrolidone to obtain a polyamide acid varnish:

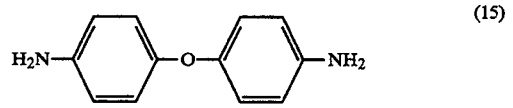

(15)

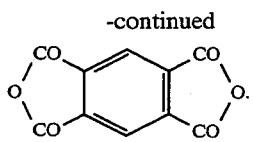
(16)

This polyamide acid varnish was applied to a glass substrate with an ITO electrode by means of a spinner, and baked at 300° C. to obtain a polyimide thin film of about 800 Å in thickness.

Figure 17:
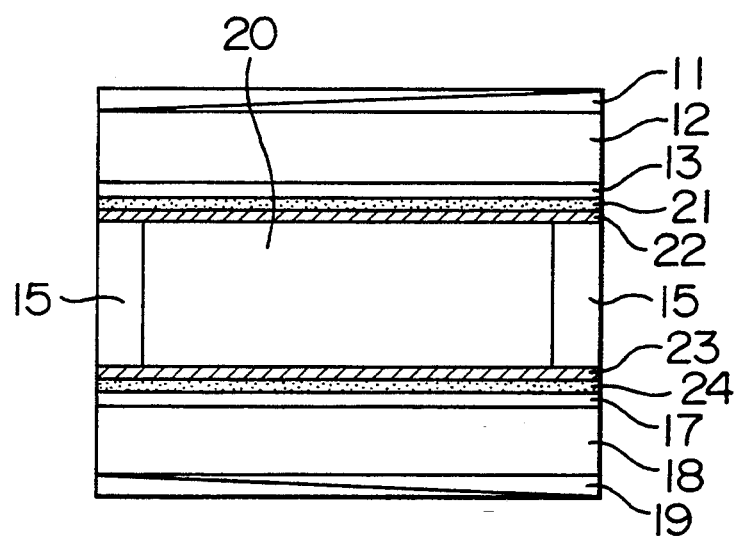
FIG. 17 is a sectional view of the liquid crystal display device in Example 17.

On the polyimide thin film prepared by the above method were deposited five layers of the p-3BCMU monomolecular film in the same manner as in Example 12 to form a polyimide/p-3BCMU composite film. A liquid crystal display device was then produced using this composite film as the orientation-controlling film. Its constitution and nematic liquid crystal used were the same as in Example 12 except that the above composite film was used as the orientation-controlling film. A schematic sectional view of this device is shown in FIG. 17. In this drawing, 21 and 24 are a polyimide thin film, 22 and 23 are a p-3BCMU monomolecular film and other numbers are the same as in FIG. 15. The liquid crystal display device thus obtained showed no unevenness of orientation, and thus a uniform liquid crystal orientation proved to have been realized. Also, the electro-optical characteristics of this device were almost the same as those of this device in Example 12.

From the above results, it was found that the p-3BCMU oriented thin film produced on the polyimide ground film according to the present invention shows a good orientation action on the liquid crystal molecules.

EXAMPLE 18

In the same manner as in Example 12, six layers of the oriented monomolecular film of p-3BCMU were deposited on a glass substrate with an ITO electrode so that the direction of the principal chain was the same for all the layers. In this Example, the in-plane orientation direction of the p-3BCMU film on each substrate was determined so that the angle of twist of liquid crystal molecules inserted between the two glass substrates was 220 degrees. A spacer of 6 μm in thickness was inserted between these substrates to obtain a cell. Thereafter, a liquid crystal composition consisting of a nematic liquid crystal mixture having the following composition,

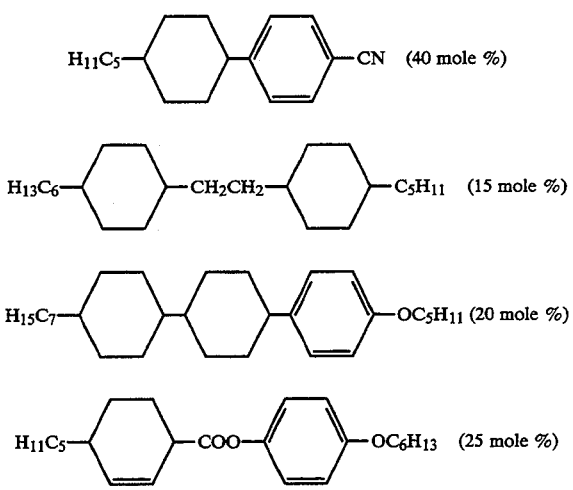

and about 0.5 wt. % of S-811 (made by Merk Co.) which is an optically active substance was sealed into the cell. Thereafter, one piece of a polarizing plate was stuck on the respective outer sides of the two substrates constituting the cell. In this case, the direction of the polarization axis of each polarizing plate was regulated so as to develop a supertwisted double refraction effect. The supertwisted nematic liquid crystal device (STN device) thus produced was examined for the presence or absence of a light-scattering domain, but the development of the domain was not observed.

From the above results, it was found that the oriented thin film produced by the method of the present invention can also be used for the STN device.

EXAMPLE 19

In the same manner as in Example 12, three layers of the oriented monomolecular film of p-3BCMU were deposited in three layers on a glass substrate with a stripe-form transparent electrode (electrode width, 200 μm; distance between electrodes, 50 μm) so that the direction of the principal chain was the same for all the layers. Another piece of completely the same specimen was prepared. These two substrates were put opposite to each other through a spacer of 4 μm so that the p-3BCMU film of each substrate turned inward and the orientation directions of the principal chain of the respective p-3BCMU films intersected perpendicularly to each other. Thus, a cell was obtained. Next, a ferroelectric liquid crystal composition consisting of

Figure 18:
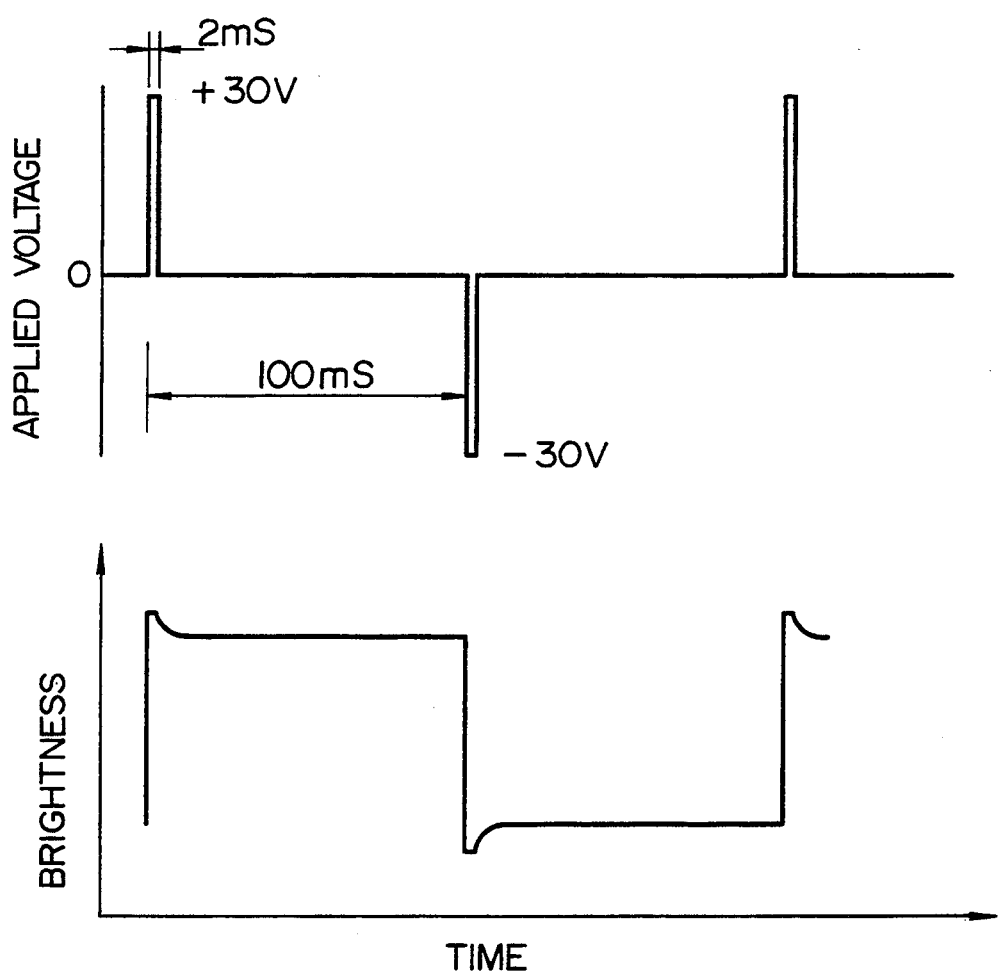
FIG. 18 is graphs showing the memory characteristics of the liquid crystal display device in Example 19.

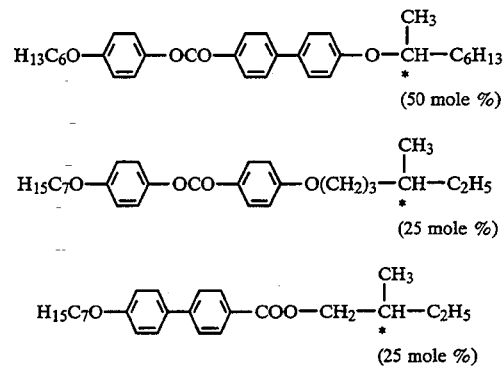

was sealed into the cell. Thereafter, one piece of a polarizing plate was stuck on the respective outer sides of the two substrates constituting the cell. At that time, the polarization axis of each polarizing plate was regulated so that it agreed with the orientation direction of the p-3BCMU film near the plate. The liquid crystal display device thus obtained showed no unevenness of orientation, and thus a uniform orientational order proved to have been realized. The electro-optical characteristics of this device were measured to obtain the results as shown in FIG. 18. FIG. 18 shows the memory characteristics of this device in relationships of time vs. applied voltage and time vs. brightness. It can be seen from FIG. 18 that the device of this Example has good memory characteristics.

From the above results, it was found that the p-3BCMU oriented thin film produced by the method of the present invention shows a good orientation action also on a ferroelectric liquid crystal molecule.

EXAMPLE 20

In the same manner as in Example 12, three layers of the oriented monomolecular film of p-3BCMU were deposited respectively on glass substrates with an ITO electrode so that the direction of the principal chain was the same for all the layers. In this Example, the in-plane orientation direction of the p-3BCMU film on each substrate was determined so that liquid crystal molecules inserted between the two glass substrates took a homogeneous orientation. A spacer of 10 μm in thickness was inserted between these substrates to obtain a cell. A liquid crystal composition consisting of a nematic liquid crystal ZLI-1132 (made by Merk Co.) and 0.2 wt. % of a dichroic dye (GR-6, produced by Nippon Kanko-shikiso Kenkyusho Co.) represented by the formula:

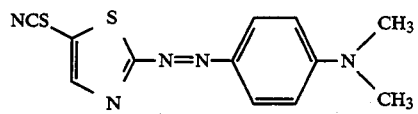

was sealed into the cell. The absorption spectrum of the guest.host-type device (GH device) thus produced was measured using two kinds of polarized lights which are parallel to and normal to the orientation direction of the liquid crystal molecule, and the dichroic ratio of the above dye was obtained from the absorbances, $A_\parallel$ and $A_\perp$, of the dye for the two polarized lights. The wavelength at a maximum absorption of the dye was 522 nm and the dichroic ratio at this wavelength was 6.3.

From the above results, it was found that the oriented thin film produced by the method of the present invention was also applicable to the GH device.

What is claimed is:

1. A liquid crystal display device comprising substrates, a polarizer, electrodes, at least one of which is transparent, and optionally semiconductor substrates, at least one of which is transparent, an orientation-controlling film of an organic thin film in which molecules constituting said organic thin film are uniformly oriented in a particular direction in the surface of the film and a liquid crystal layer, wherein said organic thin film is obtained by compressing the film-forming molecules spread at a gas/liquid interface unidirectionally or in anti-parallel direction, thereby forming a thin film at the gas/liquid interface in which said film forming molecules have been oriented in said particular direction in the surface of the film, and then transferring said thin film by a horizontal lifting or horizontal immersing method to a substrate.

2. A liquid crystal display device according to claim 1, wherein at least one of the substrates is a polymer film, and the electrodes are transparent electrodes.

3. A liquid crystal display device according to claim 2, wherein the liquid crystal layer comprises a mixed solution obtained by dissolving the polymer and the liquid crystal in a solvent to disperse the liquid crystal in a layer of the dissolved polymer.

4. A liquid crystal display device according to claim 3, wherein said solvent is an organic solvent.

5. A liquid crystal display device according to claim 2, wherein said polymer film is transparent and can be adhered to a plane or curved surface with an adhesive.

6. A liquid crystal display device according to claim 5, wherein said transparent polymer film is a polyethylene film.

7. A liquid crystal display device according to claim 1, wherein the polarizer comprises said organic thin film.

8. A liquid crystal display device according to claim 1, wherein a multi-layer film obtained by repeating the transferring of said thin film at the gas/liquid interface at least twice, is used as the orientation-controlling film for the liquid crystal.

9. A liquid crystal display device according to claim 1, wherein a polymer thin film is used as an underlying film for the orientation-controlling film.

10. A liquid crystal display device according to claim 9, wherein said polymer thin film is a polyimide film.

11. A liquid crystal display device according to claim 9, wherein said polymer thin film is produced by one method selected from the group consisting of a dipping method, spraying method, spinner method or casting method.

12. A liquid crystal display device according to claim 1, wherein said film-forming molecules comprise molecules of a polymer selected from the group consisting of polymers represented by the structural formulae (0) to (14):

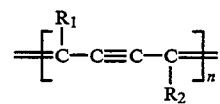 (0)

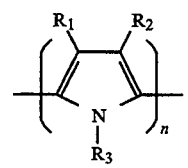 (1)

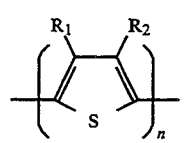 (2)

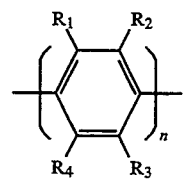 (3)

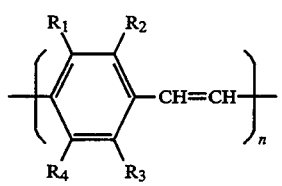 (4)

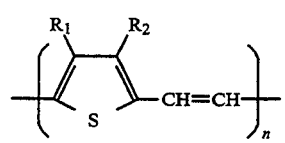 (5)

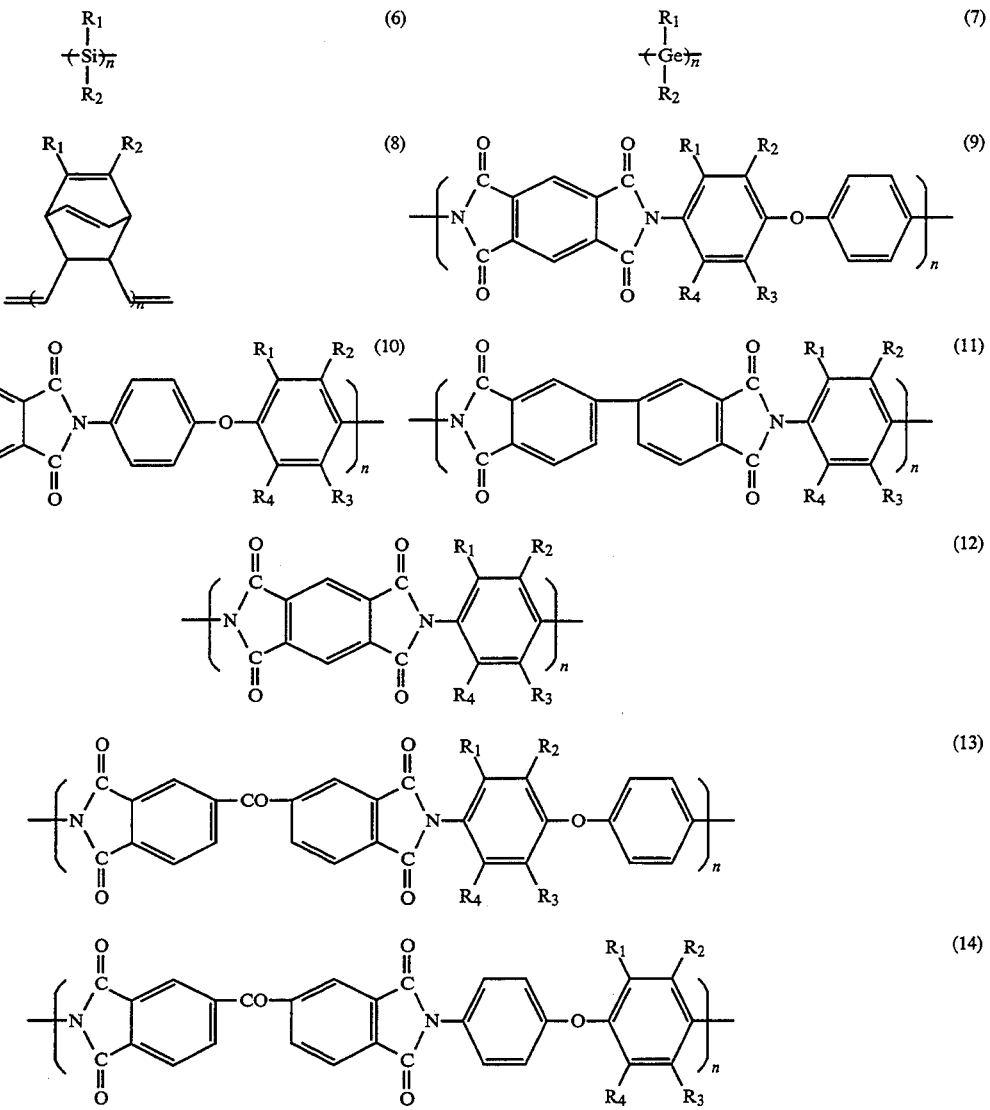

wherein substituents $R_1$, $R_2$, $R_3$ and $R_4$ independently have a structure represented by the formula:

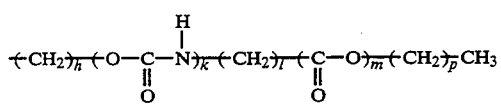

in which h is 2 to 18, k is 0 or 1, l is 1 to 18, m is 0 or 1, and p is 0 to 18, all being an integer.

13. A liquid crystal display device according to claim 1, wherein said film-forming molecules comprise molecules of a compound represented by the structural formula:

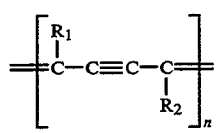

wherein each of $R_1$ and $R_2$ represents

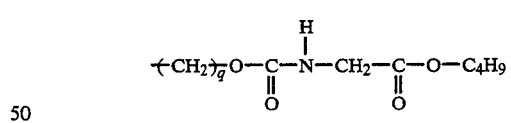

and q is an integer of 2 to 15.

14. A liquid crystal display device according to claim 1, wherein said film-forming molecules comprise molecules of a compound represented by the structural formula:

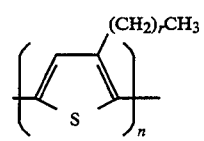

wherein r is an integer of 3 to 21.

15. A liquid crystal display device according to claim 1, wherein said film-forming molecules comprise molecules of a compound represented by the structural formula:

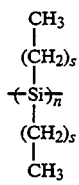

wherein s is an integer of 4 to 21.

16. A liquid crystal display device according to claim 1, wherein said orientation-controlling film comprises a first organic thin film comprising said organic thin film and a second organic thin film produced on said first organic thin film by one method selected from the group consisting of a vacuum evaporation method, molecular beam epitaxy method, dipping method, spraying method, spinner method and casting method.

17. A liquid crystal display device according to claim 16, wherein said second organic thin film is produced by depositing a compound represented by the formula:

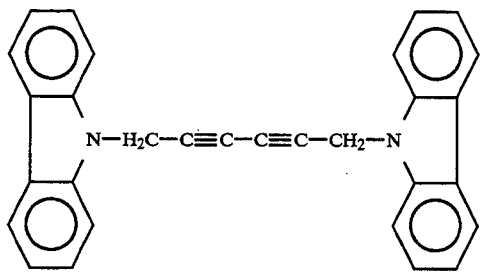

on said first organic thin film by the vacuum evaporation method and then polymerizing said compound.

18. A liquid crystal display device according to any of claims 1 and 8–17, wherein the liquid crystal is a nematic liquid crystal, and the direction of long axis of the liquid crystal molecule is spirally twisted by 80 to 280 degrees between the upper and lower substrates when electric field is not applied.

19. A liquid crystal display device according to any of claims 1 and 8–17, wherein said liquid crystal is a smectic liquid crystal.

20. A liquid crystal display device according to any of claims 1 and 8–17, wherein said liquid crystal is a mixture of a dichroic dye and a nematic liquid crystal or a mixture of a dichroic dye and a smectic liquid crystal.

21. A liquid crystal display device according to any of claims 1 and 8–17, wherein said liquid crystal is a ferroelectric liquid crystal.

22. A method for producing a liquid crystal display device comprising the steps of:
forming an orientation-controlling film by compressing film-forming molecules spread at a gas/liquid interface unidirectionally or in anti-parallel direction facing each other, to thereby form a thin film at the gas/liquid interface in which said film-forming molecules have been oriented in a particular direction in the surface of the film; and
then transferring said thin film to a substrate by a horizontal lifting method or horizontal immersing method.

23. A method for producing a liquid crystal display device according to claim 22, wherein said thin film is transferred while regulating the direction of the substrate so that the in-plane orientation direction of said film-forming molecules in said thin film coincides with a desired direction on the substrate.

* * * * *